US011447108B1

(12) United States Patent
Bailey et al.

(10) Patent No.: US 11,447,108 B1
(45) Date of Patent: Sep. 20, 2022

(54) BRAKING CONTROL SYSTEM AND METHOD TO SYSNCHRONIZE THE OPERATION OF THE BRAKING OF A TOWED VEHICLE

(71) Applicants: David Bailey, Riverview, FL (US); Russell Creed, West Hartford, CT (US); Greg Baj, New Britain, CT (US)

(72) Inventors: David Bailey, Riverview, FL (US); Russell Creed, West Hartford, CT (US); Greg Baj, New Britain, CT (US)

(73) Assignee: CREED MONARCH, INC., New Britain, CT (US)

( * ) Notice: Subject to any disclaimer, the term of this patent is extended or adjusted under 35 U.S.C. 154(b) by 0 days.

(21) Appl. No.: 15/932,947

(22) Filed: May 25, 2018

Related U.S. Application Data

(60) Provisional application No. 62/707,394, filed on Oct. 30, 2017.

(51) Int. Cl.
*B60T 8/17* (2006.01)
*B60T 8/172* (2006.01)
(Continued)

(52) U.S. Cl.
CPC ............ *B60T 8/1701* (2013.01); *B60T 8/172* (2013.01); *B60T 8/321* (2013.01); *B60T 8/3205* (2013.01);
(Continued)

(58) Field of Classification Search
CPC ...... B60T 8/1701; B60T 13/74; B60T 8/3205; B60T 13/72; B60T 8/172; B60T 8/321;
(Continued)

(56) References Cited

U.S. PATENT DOCUMENTS 2,671,859 A * 3/1954 Franko ...................... H02J 3/38
290/4 A
4,355,694 A * 10/1982 Igarashi ................... B60K 5/08
180/11

(Continued)

FOREIGN PATENT DOCUMENTS

CA         2303060 A1 * 10/2000    ............ B60T 17/223
CN       101300110 A  * 11/2008    ............ H01H 9/061
(Continued)

OTHER PUBLICATIONS

Arthur W. Fisher III, A prototype of The Creed-Monarch Patriot Model 2012 Auxiliary Braking System including a housing formed by two shells was completed at least as early as Mar. 2011 (Attachment 1). Each shell includes a groove forming a cable channel to receive a cable therein extending between a cavity and a cable connector location to couple a force measuring device to a controller (Composite Attachment 2). A production model of the Patriot Model II Auxiliary Braking System including the cavity and cable channel formed in the two shells (Attachment 3) was first sold to Blue Ox on or about Apr. 25, 2012. (Attachment 4).

*Primary Examiner* — Behrang Badu
*Assistant Examiner* — Jalal C Coduroglu
(74) *Attorney, Agent, or Firm* — Arthur W. Fisher, III

(57) ABSTRACT

A braking control system and method to synchronize the operation of the braking system of a towed vehicle with the braking system of a towing vehicle to match the deceleration and acceleration of the towed vehicle with the deceleration and acceleration of the towing vehicle wherein the braking control system includes a braking device comprising an electrically driven linear actuator coupled between an electric motor and the brake pedal of the towed vehicle and a control device coupled to the electric motor and including logic to control operation of the electrically driven linear actuator to selectively extend and retract the electrically (Continued)

driven linear actuator to selectively depress and release the brake pedal of the towed vehicle as the towing vehicle decelerates and accelerates.

9 Claims, 17 Drawing Sheets

(51) Int. Cl.
  *B60T 8/32* (2006.01)
  *B60T 13/72* (2006.01)
  *B60T 13/74* (2006.01)
  *B60T 13/46* (2006.01)
  *B60R 16/033* (2006.01)
(52) U.S. Cl.
  CPC .............. *B60T 13/46* (2013.01); *B60T 13/72* (2013.01); *B60T 13/74* (2013.01); *B60R 16/033* (2013.01); *B60Y 2200/147* (2013.01)
(58) Field of Classification Search
  CPC .. B60T 13/46; B60R 16/033; B60Y 2200/147
  See application file for complete search history.

(56) References Cited

U.S. PATENT DOCUMENTS

| | | | | |
|---|---|---|---|---|
| 4,653,931 A * | 3/1987 | Takeda | ................... | G04C 10/02 368/205 |
| 4,771,838 A * | 9/1988 | Ketcham | ................ | B62D 12/02 180/14.2 |
| 4,827,195 A * | 5/1989 | Newell | ..................... | H02P 6/04 318/49 |
| 5,002,343 A * | 3/1991 | Brearley | ............... | B60T 8/1708 303/7 |
| 5,403,238 A * | 4/1995 | Baxter | ................... | A63G 31/16 104/78 |
| 5,631,588 A * | 5/1997 | Bertolini | ............... | H02H 9/047 326/82 |
| 5,954,164 A * | 9/1999 | Latham | ................. | B60T 17/223 303/7 |
| 5,971,499 A * | 10/1999 | Pape | ......................... | B62L 1/00 188/345 |
| 6,050,649 A * | 4/2000 | Hensley | ................. | B60Q 1/441 188/158 |
| 6,068,352 A * | 5/2000 | Kulkarni | ................... | B60T 7/20 303/124 |
| 6,158,823 A * | 12/2000 | Schuck | ................. | B60T 17/221 303/7 |
| 6,211,681 B1 * | 4/2001 | Kagawa | ................ | B60L 3/0046 324/426 |
| 6,280,004 B1 * | 8/2001 | Greaves, Jr. | ............... | B60T 7/20 188/3 R |
| 6,819,065 B1 * | 11/2004 | Howarth | ................ | G11B 15/48 242/225 |
| 7,114,786 B2 * | 10/2006 | Bess | ....................... | B60T 13/66 303/7 |
| 7,224,135 B1 * | 5/2007 | Menegoli | ............. | G11B 19/28 318/294 |
| 7,552,978 B2 * | 6/2009 | Yokoyama | .............. | B60T 7/042 188/156 |
| 7,745,953 B2 * | 6/2010 | Puccetti | ................... | F02N 11/04 307/10.1 |
| 7,863,841 B2 * | 1/2011 | Menegoli | ............. | G11B 21/02 318/400.29 |
| 8,042,887 B2 * | 10/2011 | Yamamoto | ........... | B60T 8/4081 303/155 |
| 8,076,794 B2 * | 12/2011 | Proebstle | .............. | H02J 7/1423 307/9.1 |
| 8,258,852 B2 * | 9/2012 | Leung | ..................... | H02P 7/04 327/390 |
| 8,323,264 B2 * | 12/2012 | Weston | ................. | A61M 1/0066 604/543 |
| 8,339,092 B2 * | 12/2012 | Cox | ........................ | H02P 6/182 318/685 |
| 8,449,048 B2 * | 5/2013 | Bourqui | .................. | B60L 7/006 303/122.04 |
| 8,463,500 B2 * | 6/2013 | Cuddihy | ........... | B60R 21/01554 701/45 |
| 8,463,519 B2 * | 6/2013 | McCann | .................... | B60T 7/20 280/428 |
| 8,634,990 B2 * | 1/2014 | Bourqui | .................... | B60L 7/00 701/48 |
| 8,669,673 B2 * | 3/2014 | Yamashita | ............. | B62D 5/046 307/9.1 |
| 8,789,364 B2 * | 7/2014 | Huen | ...................... | B60T 13/52 60/397 |
| 8,806,271 B2 * | 8/2014 | Yong | ........................ | G06F 1/28 714/14 |
| 8,839,755 B2 * | 9/2014 | Pursifull | ............... | F02D 41/021 123/184.22 |
| 9,004,519 B1 * | 4/2015 | Beech | .................... | B60D 1/143 280/442 |
| 9,093,106 B2 * | 7/2015 | Otaguro | .................. | G11B 19/28 |
| 9,142,248 B2 * | 9/2015 | Otaguro | .................. | G11B 19/00 |
| 9,162,638 B2 * | 10/2015 | Inoue | ...................... | H02P 9/305 |
| 9,162,771 B2 * | 10/2015 | Roggemans | ........... | B64D 27/24 |
| 9,272,677 B2 * | 3/2016 | Mazumdar | ............. | B60L 50/40 |
| 9,337,683 B2 * | 5/2016 | Phillips | ............... | F02N 11/0866 |
| 9,441,557 B2 * | 9/2016 | Pursifull | ............. | F02D 41/0002 |
| 9,505,378 B2 * | 11/2016 | Darraba | .................... | H02P 7/04 |
| 9,688,259 B2 * | 6/2017 | Ozsoylu | ................ | B60T 13/145 |
| 9,770,984 B2 * | 9/2017 | Comeau | .................... | B60C 1/00 |
| 10,023,167 B2 * | 7/2018 | Yasui | ...................... | B60T 1/065 |
| 10,053,094 B2 * | 8/2018 | Mukkala, II | ......... | B60W 50/10 |
| 10,075,113 B2 * | 9/2018 | Dwersteg | ................. | H02P 8/30 |
| 10,224,839 B2 * | 3/2019 | Dietrich | .............. | H02P 29/0241 |
| 10,384,628 B2 * | 8/2019 | Mohrmann | .......... | B60R 16/033 |
| 10,525,946 B2 * | 1/2020 | Shimanaka | ............. | B60T 7/22 |
| 10,647,305 B2 * | 5/2020 | Johnson | .................. | B60T 8/17 |
| 2001/0056544 A1 * | 12/2001 | Walker | .................... | B60T 7/18 726/2 |
| 2002/0030405 A1 * | 3/2002 | Harner | ................... | B60T 13/686 303/123 |
| 2003/0117037 A1 * | 6/2003 | Pfister | ...................... | H02K 5/128 310/261.1 |
| 2003/0168908 A1 * | 9/2003 | Robinson | ................ | B60T 13/74 303/7 |
| 2004/0090195 A1 * | 5/2004 | Motsenbocker | ........ | B60L 58/33 318/109 |
| 2005/0029858 A1 * | 2/2005 | Forster | .................. | B60T 13/741 303/20 |
| 2005/0093366 A1 * | 5/2005 | Elstad | ..................... | B60T 17/221 303/7 |
| 2005/0225169 A1 * | 10/2005 | Skinner | ..................... | B60T 7/04 303/123 |
| 2006/0049686 A1 * | 3/2006 | Bess | ........................ | B60T 13/66 188/112 A |
| 2006/0071549 A1 * | 4/2006 | Chesnut | .................... | B60T 7/16 303/3 |
| 2007/0262561 A1 * | 11/2007 | Rehme | ..................... | B60D 1/50 280/483 |
| 2008/0118798 A1 * | 5/2008 | Gallagher | ......... | H01M 8/04947 429/432 |
| 2008/0174174 A1 * | 7/2008 | Burns | ...................... | G06F 17/00 303/152 |
| 2009/0272608 A1 * | 11/2009 | Bourqui | .................. | B60L 3/0046 188/160 |
| 2012/0102940 A1 * | 5/2012 | Ueno | ..................... | B60T 7/042 60/537 |
| 2012/0240696 A1 * | 9/2012 | Bastholm | ................ | A47C 20/042 74/89.38 |
| 2012/0256568 A1 * | 10/2012 | Lee | ...................... | B60L 15/007 318/139 |
| 2013/0158826 A1 * | 6/2013 | Cusi | ...................... | B60T 8/1708 701/70 |
| 2013/0233109 A1 * | 9/2013 | Kaminski | ................ | B60T 7/20 74/469 |

(56) References Cited

U.S. PATENT DOCUMENTS

| | | | |
|---|---|---|---|
| 2013/0253814 A1* | 9/2013 | Wirthlin | G01G 19/02 |
| | | | 701/1 |
| 2013/0255440 A1* | 10/2013 | Blond | B60K 25/06 |
| | | | 74/661 |
| 2013/0311058 A1* | 11/2013 | Wojtkowicz | H02J 7/1461 |
| | | | 701/70 |
| 2014/0088827 A1* | 3/2014 | Yashiro | B60L 1/003 |
| | | | 701/36 |
| 2014/0190155 A1* | 7/2014 | Kenway | F02C 6/16 |
| | | | 60/415 |
| 2014/0225429 A1* | 8/2014 | Mazumdar | E02F 9/2075 |
| | | | 307/9.1 |
| 2014/0318342 A1* | 10/2014 | Koegel | B23D 59/002 |
| | | | 83/477.1 |
| 2015/0015065 A1* | 1/2015 | Brunais | B60L 53/57 |
| | | | 307/10.8 |
| 2015/0107220 A1* | 4/2015 | Chakkera | F02K 1/805 |
| | | | 60/226.2 |
| 2015/0203087 A1* | 7/2015 | Ozsoylu | B60T 13/145 |
| | | | 188/359 |
| 2016/0244998 A1* | 8/2016 | Kraus | E05B 81/34 |
| 2017/0168503 A1* | 6/2017 | Amla | B60W 30/165 |
| 2018/0126967 A1* | 5/2018 | Sanders | B60T 8/323 |
| 2018/0236988 A1* | 8/2018 | Shimanaka | B60T 13/662 |
| 2019/0233034 A1* | 8/2019 | Viele | B62D 49/007 |
| 2019/0315320 A1* | 10/2019 | Maat | B60T 7/20 |
| 2019/0359018 A1* | 11/2019 | Brickley | B60W 50/14 |
| 2020/0228036 A1* | 7/2020 | Dwersteg | H02P 8/32 |
| 2020/0274375 A1* | 8/2020 | Griffiths | H02J 7/1423 |

FOREIGN PATENT DOCUMENTS

| | | | | | |
|---|---|---|---|---|---|
| CN | 101865065 | A | * | 10/2010 | F02N 11/0855 |
| CN | 101962008 | A | * | 2/2011 | B60T 13/746 |
| CN | 104976407 | A | * | 10/2015 | F02D 41/1401 |
| DE | 102011083304 | A1 | * | 5/2012 | B60T 11/18 |
| EP | 0006236 | A1 | * | 1/1980 | B60D 1/143 |
| EP | 2657091 | A1 | * | 10/2013 | H02P 4/00 |
| GB | 2436692 | A | * | 10/2007 | B60R 21/01554 |
| GB | 2528255 | A | * | 1/2016 | B60T 13/12 |
| JP | 2007191133 | A | * | 8/2007 | F16D 55/226 |
| JP | 2011079525 | A | * | 4/2011 | B60T 13/12 |
| JP | 2019130939 | A | * | 8/2019 | B60W 20/11 |
| WO | WO-9505223 | A1 | * | 2/1995 | A63G 31/16 |
| WO | WO-0046062 | A1 | * | 8/2000 | B60L 7/14 |
| WO | WO-2008041684 | A1 | * | 4/2008 | H02J 7/1423 |
| WO | WO-2012131870 | A1 | * | 10/2012 | B60T 8/267 |
| WO | WO-2015025971 | A | * | 2/2015 | H02P 4/00 |
| WO | WO-2015113420 | A1 | * | 8/2015 | B60W 20/11 |
| WO | WO-2017121903 | A1 | * | 7/2017 | B60D 1/155 |
| WO | WO-2017149526 | A2 | * | 9/2017 | G01B 15/00 |
| WO | WO-2018021176 | A1 | * | 2/2018 | H02P 21/36 |
| WO | WO-2018047524 | A1 | * | 3/2018 | H02P 21/22 |
| WO | WO-2018072791 | A | * | 4/2018 | H02P 8/12 |
| WO | WO-2018072791 | A1 | * | 4/2018 | H02P 8/12 |

* cited by examiner

BRAKING CONTROL SYSTEM AND METHOD TO SYSNCHRONIZE THE OPERATION OF THE BRAKING OF A TOWED VEHICLE

CROSS REFERENCE

This utility application claims priority of provisional application Ser. No. 62/707,394 filed Oct. 30, 2017.

BACKGROUND OF THE INVENTION

Field of the Invention

A braking system and method to synchronize the operation of the braking system of a towed vehicle with the braking system of a towing vehicle.

Description of the Prior Art

Often recreational vehicles, motor homes, trucks, and the like tow a smaller vehicle hitched thereto. The combined weight of the towing vehicle and towed vehicle creates a dangerous braking condition when using only the towed vehicle brake system.

This increased mass impacts both the stopping distances and time, as well as creates excessive wear on the brakes of the towing vehicle. Further, the mechanical connection between the towing vehicle and the towed vehicle is overly stressed.

Furthermore, ABS systems present a contamination problem when being towed. These ABS systems are rendered inoperative when the fluid level decreases. As such, these ABS brake systems can cause faults in their computer programs and operation of the brake and traction systems.

The prior art has sought to remedy this problem. In one such remedy, each time a vehicle is to be towed, a device is inserted into that vehicle to operate its braking system, or to substitute for its braking system. The device is then connected to the braking system of the towing vehicle through hydraulic, high pressure air, or vacuum lines. Though more effective than having no contribution to overall braking from the towed vehicle, these remedies rarely approach the ideal, in which no additional load is placed on the towing vehicle's brakes. Further, in order to independently operate the towed vehicle, the installed braking device must be removed, as well as the hydraulic, air or vacuum lines. The inconvenience of repeatedly installing and removing braking devices and cumbersome lines has limited the acceptance of these types of prior art systems. Additionally, the required connection and disconnection may result in air or other contamination of the closed brake systems, rendering them inoperative.

Specific examples of the prior art are discussed below.

U.S. Pat. No. 6,609,766 shows a progressive and proportional braking system for use with a towed vehicle. Utilizing the towed vehicle's existing vacuum power assisted braking system.

U.S. Pat. No. 8,430,458 discloses an auxiliary braking system located in a towed vehicle for braking the towed vehicle including a remote control to selectively communicate with an auxiliary braking unit in a towing vehicle. The auxiliary braking system allows the operator of the towing vehicle to assess the functioning of the auxiliary braking unit. In addition, the operator is able to remotely effect real time adjustments to the performance parameters of the auxiliary braking system while driving.

US 2006/0071549 relates to a electronic controlled vacuum powered brake system for a towed vehicle such as a boat, horse, travel, fifth wheel and utility trailers. Comprising a vacuum power assisted master cylinder with two outlet ports of hydraulic power, a vacuum pump, a solenoid, an electronic power module, and a dash control module. The power brake unit is directly connected by lever arm to the solenoid of the towed vehicle.

U.S. Pat. No. 6,609,766 describes a braking system for a towing vehicle and a towed vehicle wherein the towing vehicle's brake system sends an electronic relay to the towed vehicle's brake system to apply the brakes of the towed vehicle at the proper rate of deceleration.

US 2004/0160117 shows an auxiliary braking apparatus configured for use with a towed vehicle. Configuring a solid state inertia device to sense changes in inertia attributable to the braking of the towing vehicle. The auxiliary braking apparatus includes a reservoir constructed from a two step injection molding process thereby lowering overall manufacturing costs of the braking apparatus as well as improving the ability of the reservoir to be directly mounted to the housing of the braking apparatus.

U.S. Pat. No. 6,126,246 relates to towed vehicle braking systems including a compressor to drive a fluid actuator with a piston attached to the towed vehicle's brake actuator, e.g., a brake pedal or hand grip. The braking system is actuated by either a towed vehicle velocity decrease sensor, a separation of the towed vehicle and the towing vehicle sensor and/or coded signals from a radio transmitter operated by the driver of the towing vehicle to control the braking system of the towed vehicle.

U.S. Pat. No. 6,631,636 shows a device for testing the hydraulic brake system of motor vehicles for the presence of small and extremely small leaks comprising a loading rod including a non-rotating extendable spindle and measuring head.

While some of the prior art may contain similarities relating to the present invention, none teaches, suggests or includes all of the advantages and unique features of the invention disclosed hereafter.

SUMMARY OF THE INVENTION

The present invention relates to a braking control system and method to synchronize the braking of a towed vehicle and a towing vehicle comprising a braking device located between the driver's seat and brake pedal of the towed vehicle and a remote device that is a portable device movable from the towed vehicle during installation and set-up of the braking control system to the towing vehicle during operation of the brake control system.

The braking device comprises an enclosure to house a brake control including braking control electronics circuitry and processor software and an electric actuator drive motor.

A linear actuator arm movable between a retracted position and extended position in response to G force exerted on the towed vehicle extends outwardly from the front wall of the enclosure and is coupled between the electric actuator drive motor and a brake pedal coupler disposed outside the enclosure to secure the linear actuator arm to the brake pedal of the towed vehicle.

A brake interface or input brake control panel including a power-on button and a set-up button connected to the braking control electronics circuitry and processor software of the brake control mounted on the enclosure. A power supply is connected between the braking device and the towed vehicle nominal 12 volt battery.

The remote device comprises a remote control enclosure to house remote control electronic circuitry and processor software to provide multiple data or information screens, remote display status of the hitch disconnect sensor status, tire pressure monitor status, remote braking control and system set-up functions. A graphic display and a remote control interface is positioned on the remote control enclosure. The remote control interface provides input controls including braking device set-up configuration and manual brake control to remotely actuate the linear actuator arm to operate the braking device.

A power supply is connected between the remote device and the towing vehicle nominal 12 volt battery when the remote device is located in the towing vehicle.

The brake pedal coupler comprises an upper coupler member having at least one upper clamp member affixed to the front thereof and a lower coupler member having at least one lower clamp member affixed to the front thereof to clamp or secure the linear actuator arm to the brake pedal of the towed vehicle.

Extension and retraction of the linear actuator arm by the electric brake actuator motor to apply the braking force to the brake pedal is controlled by the brake control to selectively depress and release the brake pedal of the towed vehicle proportionally or in synchronization with the towing vehicle deceleration or acceleration.

The brake control comprises a brake microcontroller including digital and communication circuitry to receive and transmit signals to operate the electric actuator drive motor and to communicate with the remote device.

Specifically, the brake microcontroller includes electronic components, logic circuitry and software to receive signals and power from the other elements and components of the braking device and to generate control signals, status signals and operating signals fed to the various elements and components of the braking device and to communicate with the remote device.

Power is supplied to the braking device by a primary power source charged to about nominal 18 volts and a secondary power source charged to about nominal 12 volts.

The boosted or increased supply voltage from the primary power source operates the electric actuator drive motor at a significantly increased speed increasing the speed of extension and retraction of the linear actuator arm as the towing vehicle and towed vehicle decelerate and accelerate.

The electric brake actuator motor is powered through an integrated motor driver circuit controlled by the brake microcontroller.

The amount of current value fed to the integrated motor driver integrated circuit and the electric brake actuator motor is measured by a current sensor. The current sensor is also connected or coupled to the brake microcontroller to feed real time current values to control the applied braking force calculated by the brake microcontroller in response to the G force exerted on the towed vehicle.

The electric brake actuator motor is rated to operate at 4000 revolutions per minute with a nominal 12 volt power source. However, when the primary power source supplies about a nominal 17 volts to about nominal 18 volts, the electric brake actuator motor operates at about 5850 revolutions per minute rather than the rated 4000 revolutions per minute an increase of rotational speed of at least about 25 percent.

The position of the brake pedal coupler and the linear actuator arm relative to the fully retracted position directly correlates or corresponds to the applied braking force detected by an applied braking force detector implemented in one of several ways. For example, a motor encoder senses and reads or counts the number of revolutions or turns of the electric actuator drive motor when extending or advancing the linear actuator arm from the fully retracted position to the linear position corresponding to the required applied braking force calculated by the brake microcontroller.

Thus, the force applied on the brake pedal by the brake pedal coupler and the linear actuator arm is calculated by the brake microcontroller as a function of the number of revolutions or turns of the electric actuator drive motor counted by the motor encoder. Alternately, a mechanical force sensor such as a strain gauge mounted on the linear actuator arm detects or senses directly the applied force exerted on the brake pedal by the linear actuator arm. The applied force is fed to the brake microcontroller to control the extension and retraction of the linear actuator arm corresponding to the calculated applied force relating to the G force measured by the brake inertia sensor.

In other words, as the force applied to the brake pedal in the towing vehicle increases or decreases the electric brake actuator drive motor extends or retracts the linear actuator arm by rotating the number of revolutions or turns of the electric brake actuator drive motor corresponding to the number of revolutions or turns corresponding to the real time applied force determined by the brake microcontroller. Alternately, as the towing vehicle accelerates or decelerates, the brake inertia sensor senses real time G force exerted on the towed vehicle and feeds a G force signal to the brake microcontroller to extend or retract the linear actuator arm and brake pedal coupler to the linear position or distance correlating or corresponding to the real time force corresponding to the measured or sensed G force.

A brake transceiver is connected to the brake microcontroller to exchange system configuration information and packet data with the remote device to provide remote and network control.

Periodically the remote device transmits requests for status information or data packets to the braking device that responds by transmitting the requested information or data as well as brake event information to the remote device.

The brake interface or input control panel is coupled to the brake microcontroller to set-up and operate the braking device.

As previously described, the brake inertia sensor such as an accelerometer is coupled to the brake microcontroller to sense and feed real time G force information exerted on the towed vehicle to the brake microcontroller as the speed of the towed vehicle increases or decreases as the speed of the towing vehicle increases or decreases. In turn, the brake microcontroller logic and software generates the braking force to be applied to the brake pedal as the linear actuator arm and brake pedal coupler are extended or retracted by the electric actuator drive motor.

The remote device comprises a remote microcontroller including digital and communication circuitry to receive and transmit signals to monitor and selectively control the braking device. Otherwise, the remote microcontroller includes electronic components, logic circuitry and software to receive signals and power from the other elements and components of the brake device and to generate and transmit control signals, status signals and operating signals fed to the various elements of the braking device.

A remote transceiver is connected to the remote microcontroller to exchange configuration and to packet data with the braking control through the brake transceiver and to provide remote control of the braking device including the electric actuator drive motor and the linear actuator arm.

Digital packet and configuration data are communicated between the brake microcontroller and the remote microcontroller through the brake transceiver and the remote transceiver. Periodically, data packets and switches events are also transmitted between the brake transceiver and the remote transceiver.

To install the braking device in the towed vehicle, the driver's seat is pushed back allowing space for the braking device to be placed on the floor between the brake pedal and the front of the driver's seat. The brake pedal coupler is then secured to the brake pedal clamping the upper clamp member and lower clamp member together.

With the brake pedal coupler secured to the brake pedal, the driver's seat is moved forward against the braking device. When the braking device is properly positioned, the driver's seat should not exert pressure on the braking device or brake pedal.

Once the braking device is properly positioned and secured in place, the power supply connector and power cord are connected or coupled to the power receptacle of the towed vehicle.

Initially, when the power button is depressed an indicator light blinks repeatedly.

The braking device is then configured using the remote control button(s) or switch(es) of the brake interface or control.

When the braking device is configured and with power supplied to the brake device, the set-up button or switch is depressed energizing the electric brake actuator motor partially extending the linear actuator arm from the fully retracted position depressing the brake pedal to partially deplete a portion of the vacuum from the vacuum power assist brake system and to verify that the brake actuator extension is within the range of motion of the linear actuator arm.

After the braking device is configured and set-up, a predetermined number of braking cycles apply only partial braking forces of the calculated applied braking force to further purge the vacuum power assist brake system.

The amount of force applied by the linear actuator arm and brake pedal Coupler to the brake pedal is proportional to the deceleration or acceleration G force sensed by the brake inertia sensor accelerometer. For example, if the maximum force capable of being applied at 1G is 90 pounds programmed into the brake microcontroller by the remote control then a 45 pound force will be applied to the brake pedal at ½ G deceleration and a force of 67.5 pounds would be applied to the brake pedal when the deceleration is ¾ Gs. The electronic circuitry and software of the brake microcontroller calculates the amount of force that correlates or corresponds to real time G force to be applied on the towed vehicle and generates a control signal to the electric brake actuator drive motor.

The force applied by the brake device to the brake pedal is controlled by the amount of current fed to the electric brake actuator drive motor through the integrated motor driver integrated circuit of the brake microcontroller. The applied force is monitored real time or sensed by the force sensor that is either the mechanical force sensor or by the motor encoder that senses the revolutions of the electric actuator drive motor as linear actuator arm and the brake pedal coupler extend or retract and generates a signal fed to the brake microcontroller that correlates or corresponds to the number of turns is from the fully retracted position that is correlated or corresponded to the applied force.

When retracting the linear actuator arm and the brake pedal coupler at the end of a braking cycle or as the amount of deceleration is decreased by easing off the towing vehicle braking system, the electric brake actuator drive motor retracts the linear actuator arm and brake pedal actuator reducing or eliminating the braking force on the brake pedal. The position of the linear actuator arm relative to the fully retracted position when no force is applied to the brake pedal is sensed either by the mechanical force sensor or revolutions registered by the motor encoder as an indication of the position or extension of the linear actuator arm related to the original or fully retracted position and corresponding applied force.

The primary power source not only provides increased motor speed (rpm) but also assures that the linear actuator arm and brake pedal coupler can be fully retracted even if the second or secondary power source is not sufficient to retract the linear actuator arm.

This summary is not intended to describe essential features of the claimed subject matter nor is it intended to limit the scope of the claimed subject matter. To the contrary, this summary merely outlines various concepts and features that are developed in the detailed description.

BRIEF DESCRIPTION OF THE DRAWINGS

For a fuller understanding of the nature and object of the invention, reference should be had to the following detailed description taken in connection with the accompanying drawings in which.

DETAILED DESCRIPTION OF THE INVENTION

The present invention relates to a braking control system and method to synchronize the braking of a towed vehicle such as an automobile and a towing vehicle such as a motor home or recreational vehicle. The braking control system comprises a braking device generally indicated as 10 in FIGS. 1 and 2 and a remote device generally indicated as 12 in FIG. 3.

Figure 1:
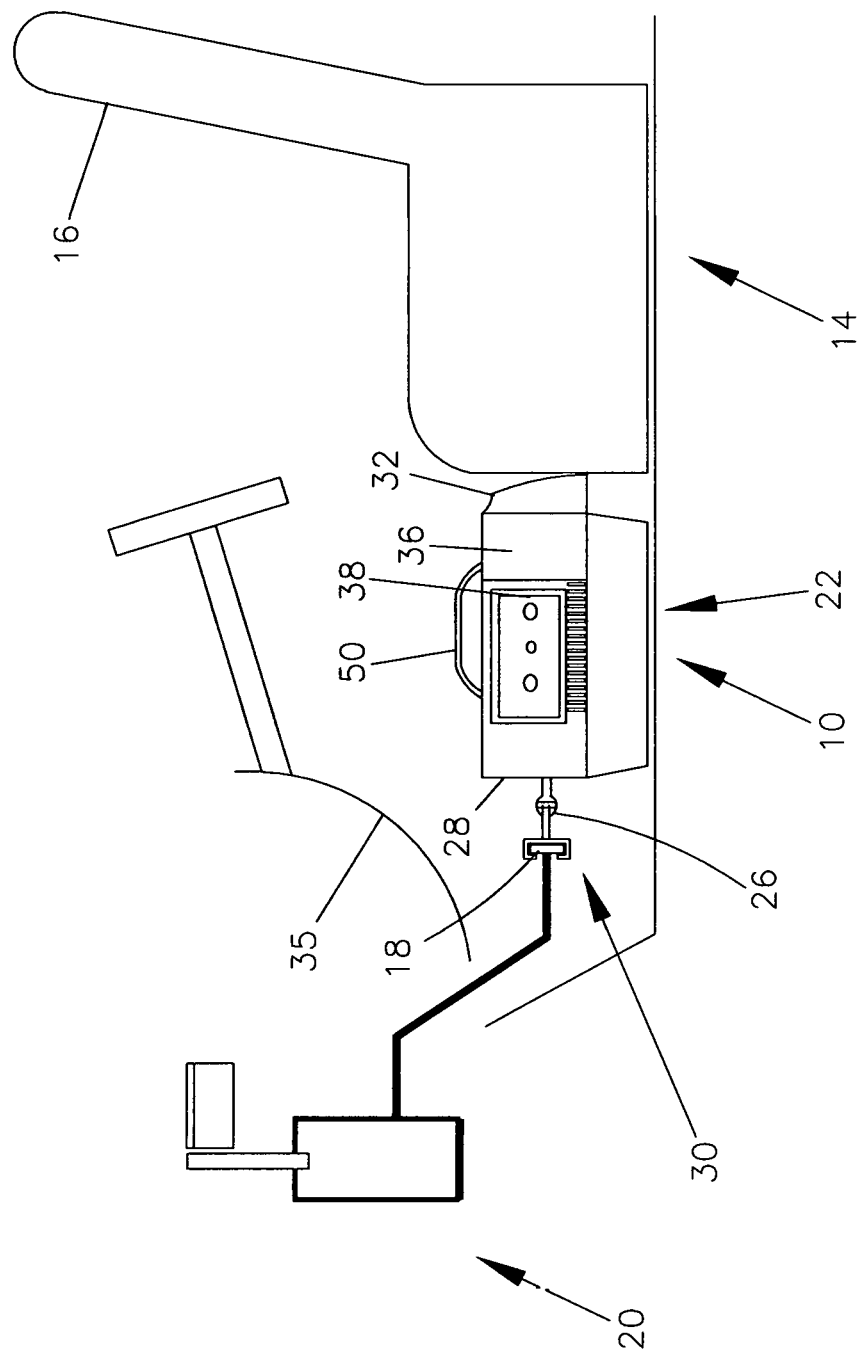
FIG. 1 is a side view of the braking device installed in a towed vehicle.

As shown in FIG. 1, the braking device 10 is operatively located in a towed vehicle 14 between the driver's seat 16 and the brake pedal 18 that is, in turn, coupled to the towed vehicle's vacuum power assisted hydraulic brake system generally indicated as 20.

Figure 3:
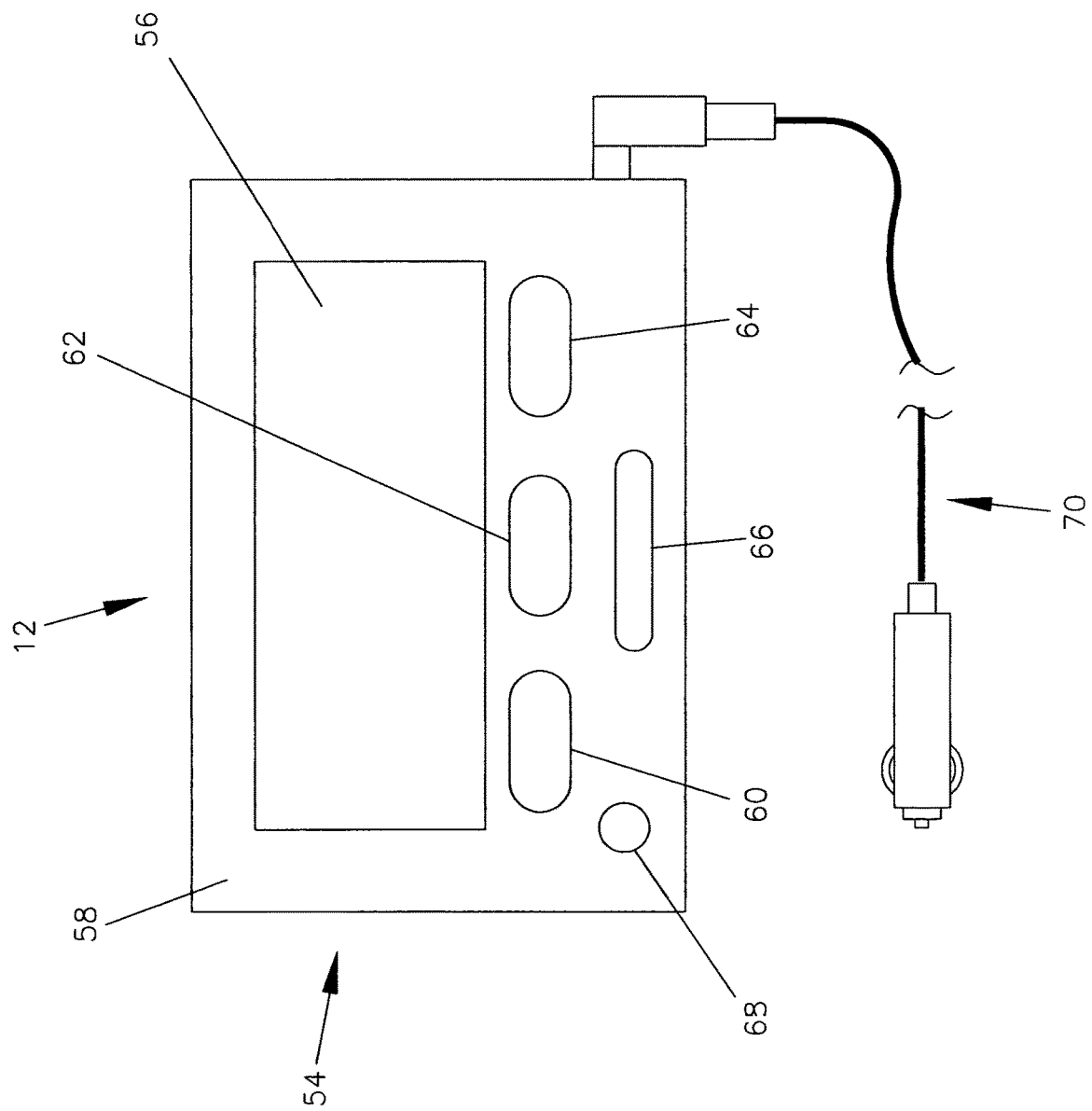
FIG. 3 is a front view of the remote device.

The remote device 12 as shown in FIG. 3 is a portable device (hand held) and movable between the towed vehicle 14 during installation and set-up of the braking control system and the towing vehicle (not shown) when operating the brake control system during travel.

Figure 2:
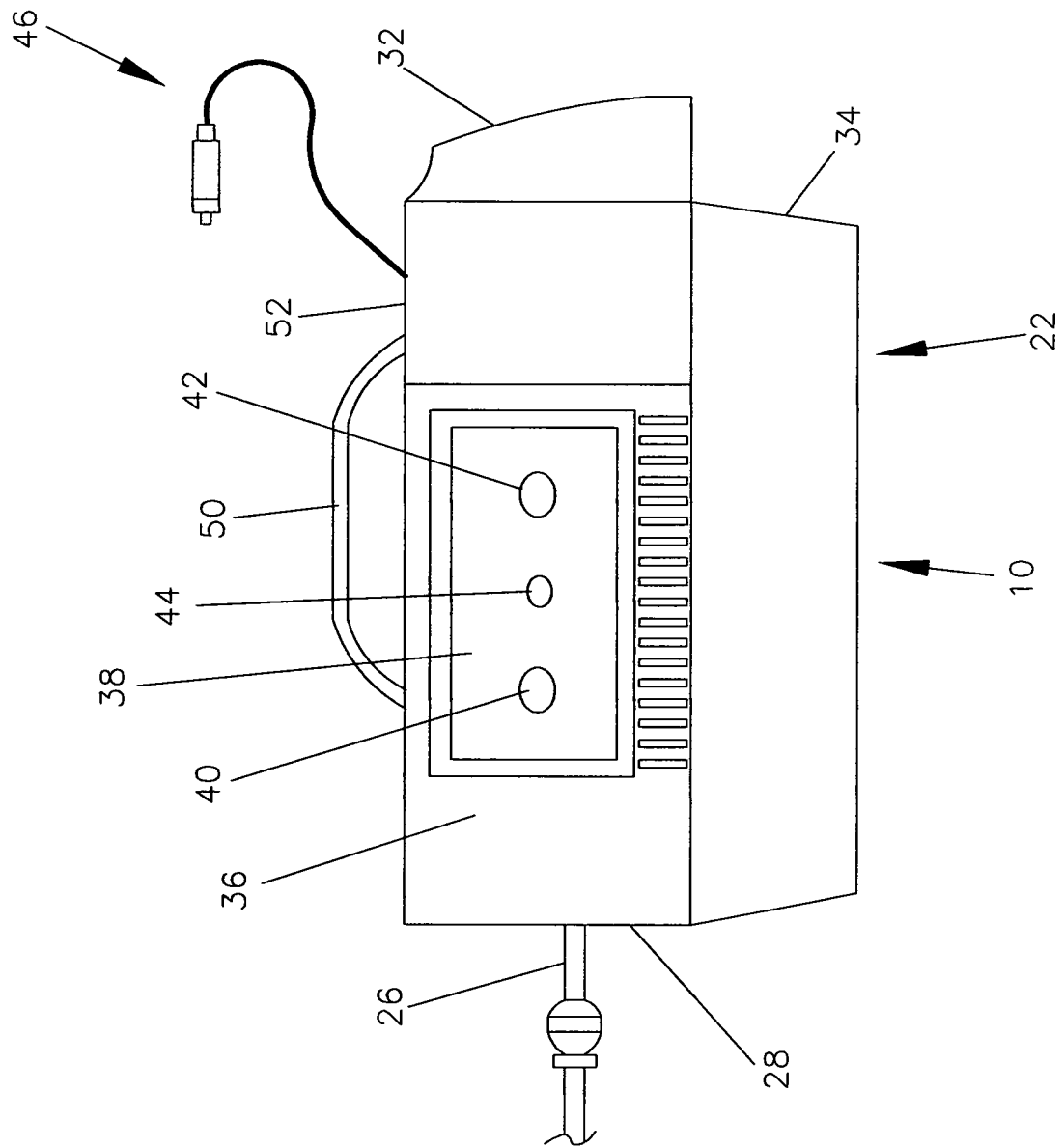
FIG. 2 is a side view of the braking device.
Figure 5:
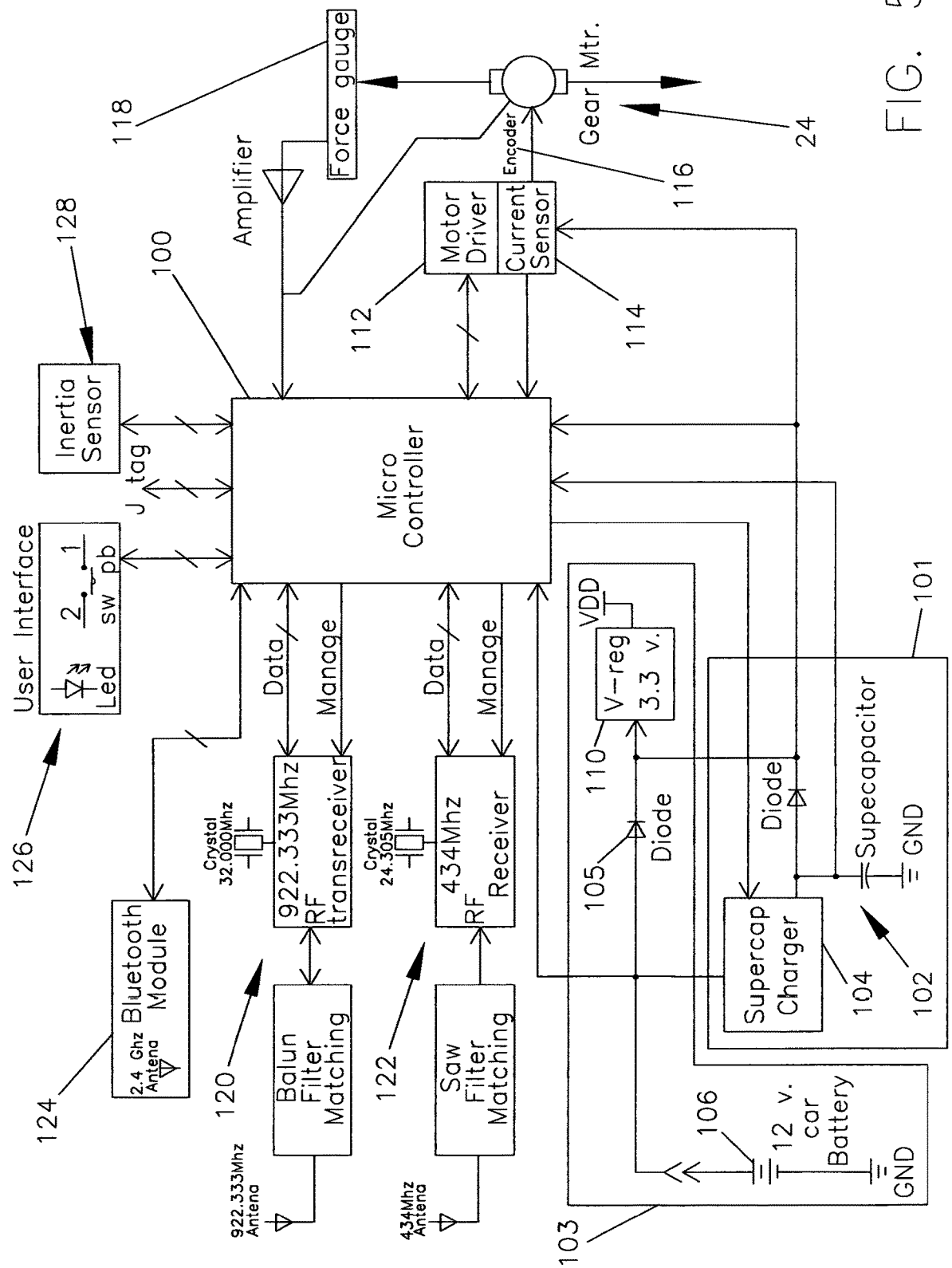
FIG. 5 is a block diagram of the brake control.

As shown in FIGS. 1 and 2, the braking device 10 comprises a brake control enclosure or housing generally indicated as 22 to house a brake control including braking control electronics circuitry and processor software (FIG. 5) together with an electric actuator drive motor such as a nominal 12 volt brushed permanent magnet direct current motor generally indicated as 24 in FIG. 5.

As shown in FIG. 1, a linear actuator arm 26 selectively movable between a retracted position and extended position in response to G forces exerted on the towed vehicle 14 extends outwardly from the front wall 28 of the brake control enclosure or housing 22 and is coupled between the electric actuator drive motor 24 (FIG. 5) disposed within the brake control enclosure or housing 22 and a brake pedal coupler generally indicated as 30 disposed outside the brake control enclosure or housing 22 to secure the linear actuator arm 26 to the brake pedal 18 of the towed vehicle 14.

An adjustment pad 32 is mounted to the rear wall 34 of the brake control enclosure or housing 22 to provide means to adjust the position of the brake control enclosure or housing 22 and adjustment pad 32 to accommodate the height of the driver's seat 16.

Formed on the side wall 36 of the brake control enclosure or housing 22 is a brake interface or input brake control panel 38 to support a setup button or switch 40 and a power button or switch 42 each of which is connected or coupled to the braking control electronics circuitry and processor software (FIG. 5). In addition, a towed vehicle break-away port 44 connected to the brake control is mounted to the brake control panel 38. A power supply connector and power cord together generally indicated as 46 is connected to the brake control enclosure or housing 22 to connect or couple the braking device 10 to the towed vehicle nominal 12 volt battery (not shown). The braking device 10 may also include a carrying handle 50 formed on or affixed to the top wall 52 of the brake control enclosure or housing 22.

Figure 6:
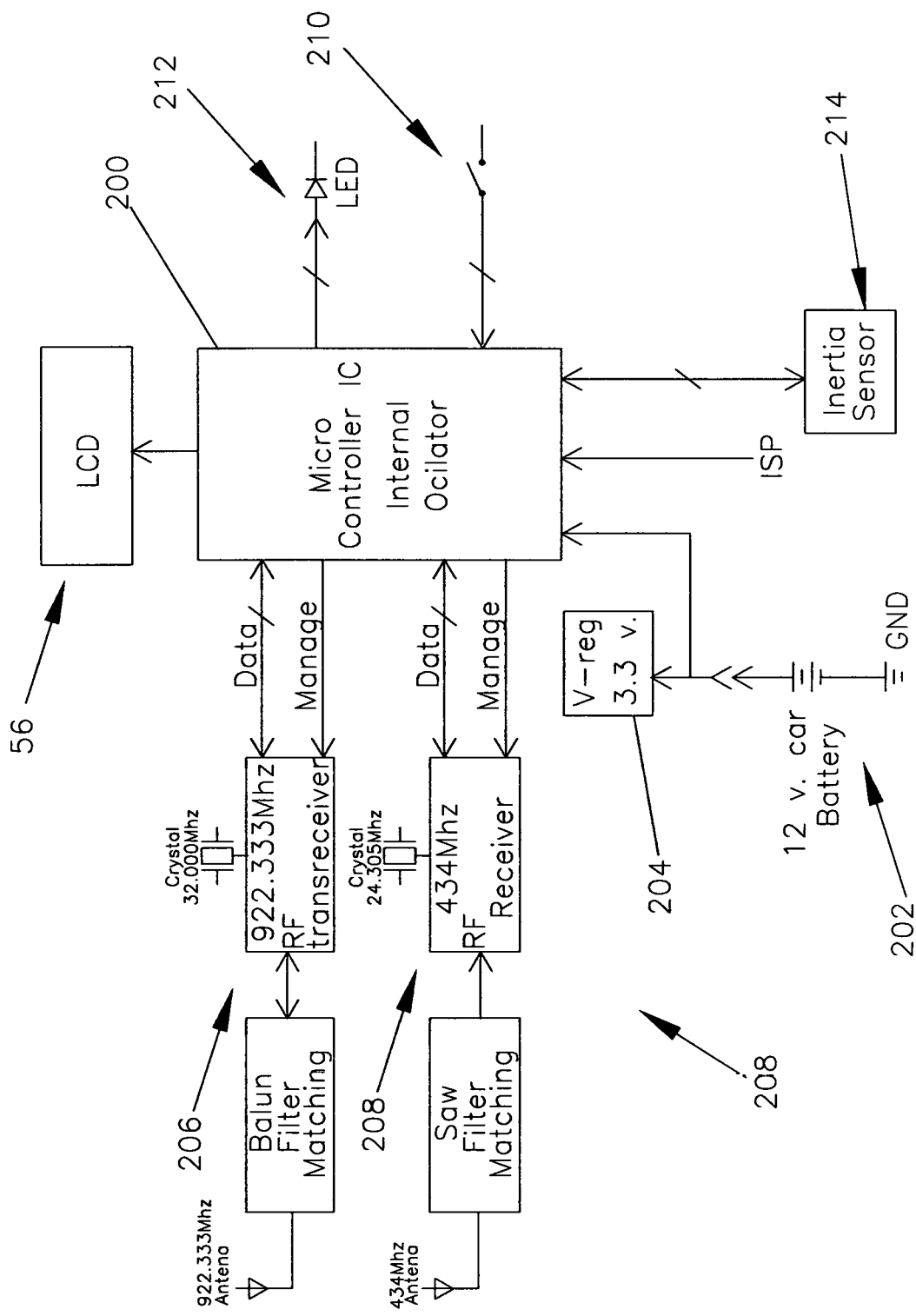
FIG. 6 is a block diagram of the remote control.
Figure 8:
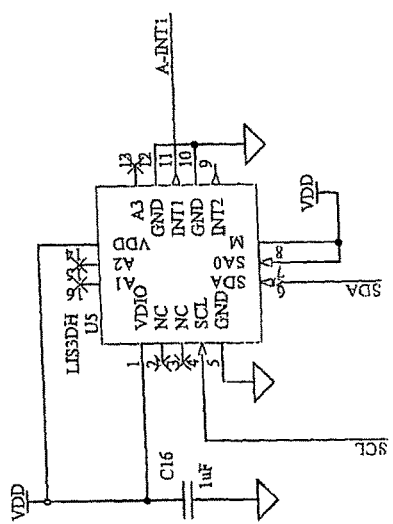
FIG. 8 is a detailed diagram of the brake inertia sensor of the brake control.
Figure 7:
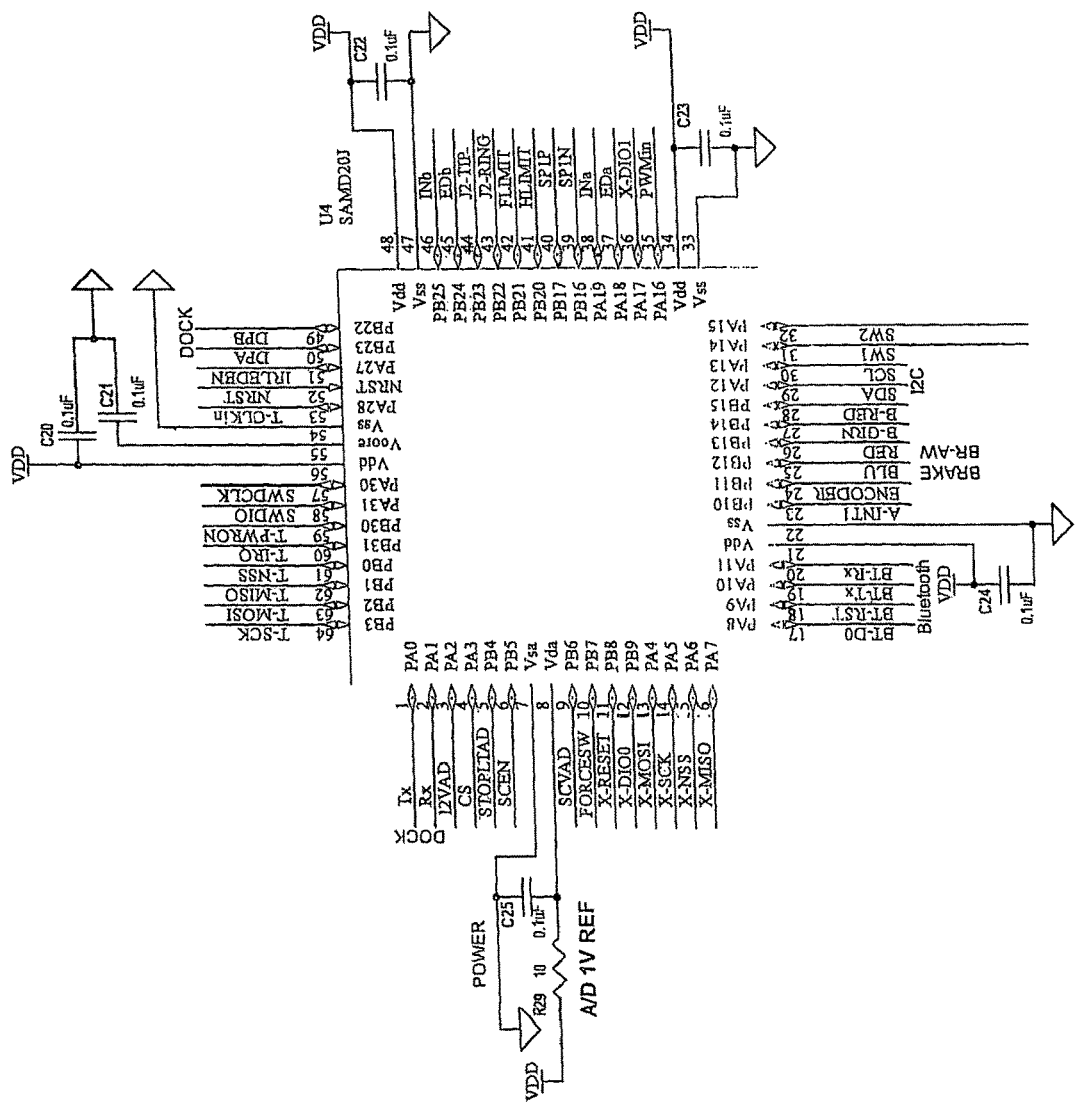
FIG. 7 is a detailed diagram of the brake microcontroller of the brake control.
Figure 9:
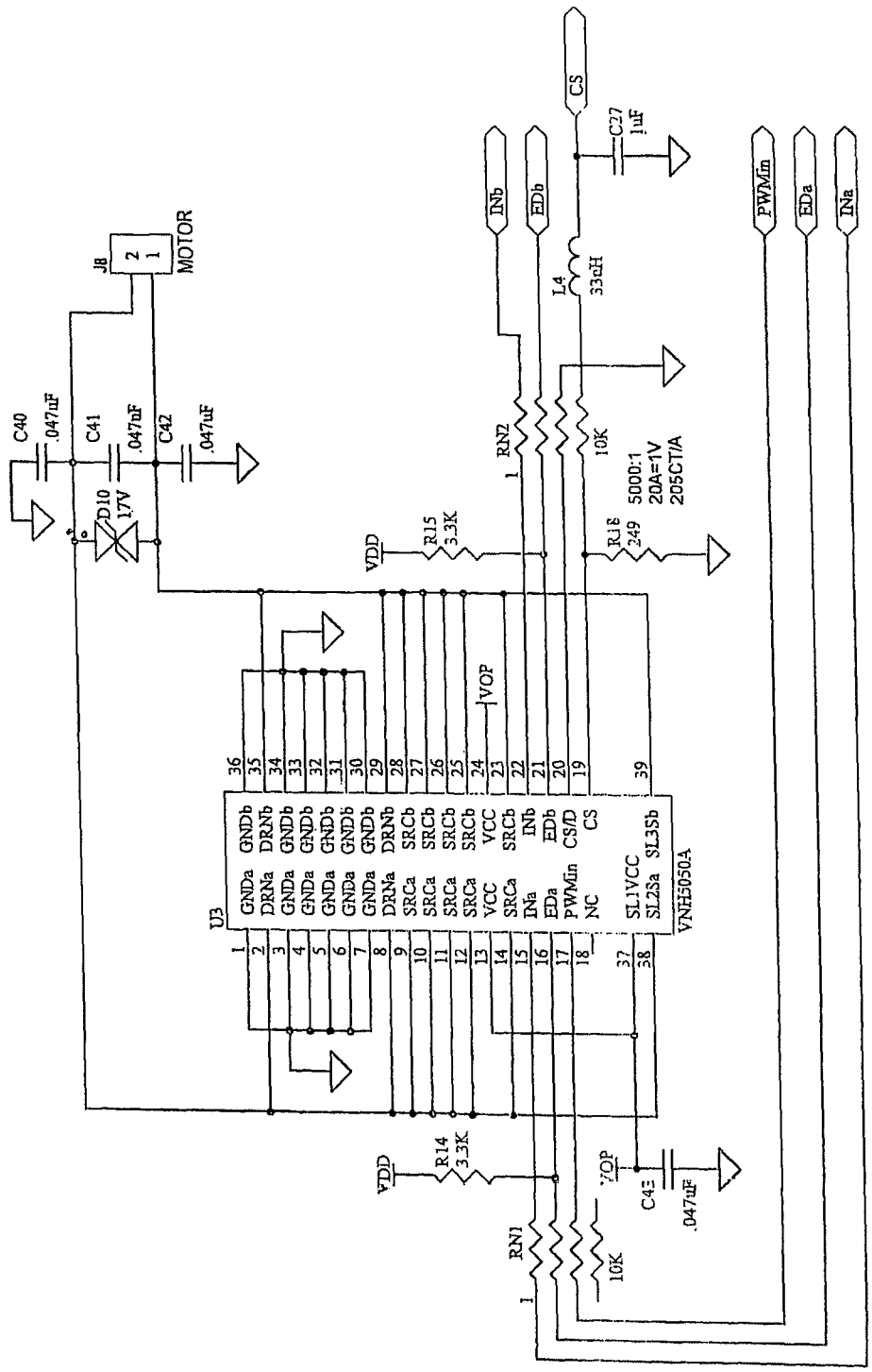
FIG. 9 is a detailed diagram of the motor driver/current sensor of the brake control.
Figure 10:
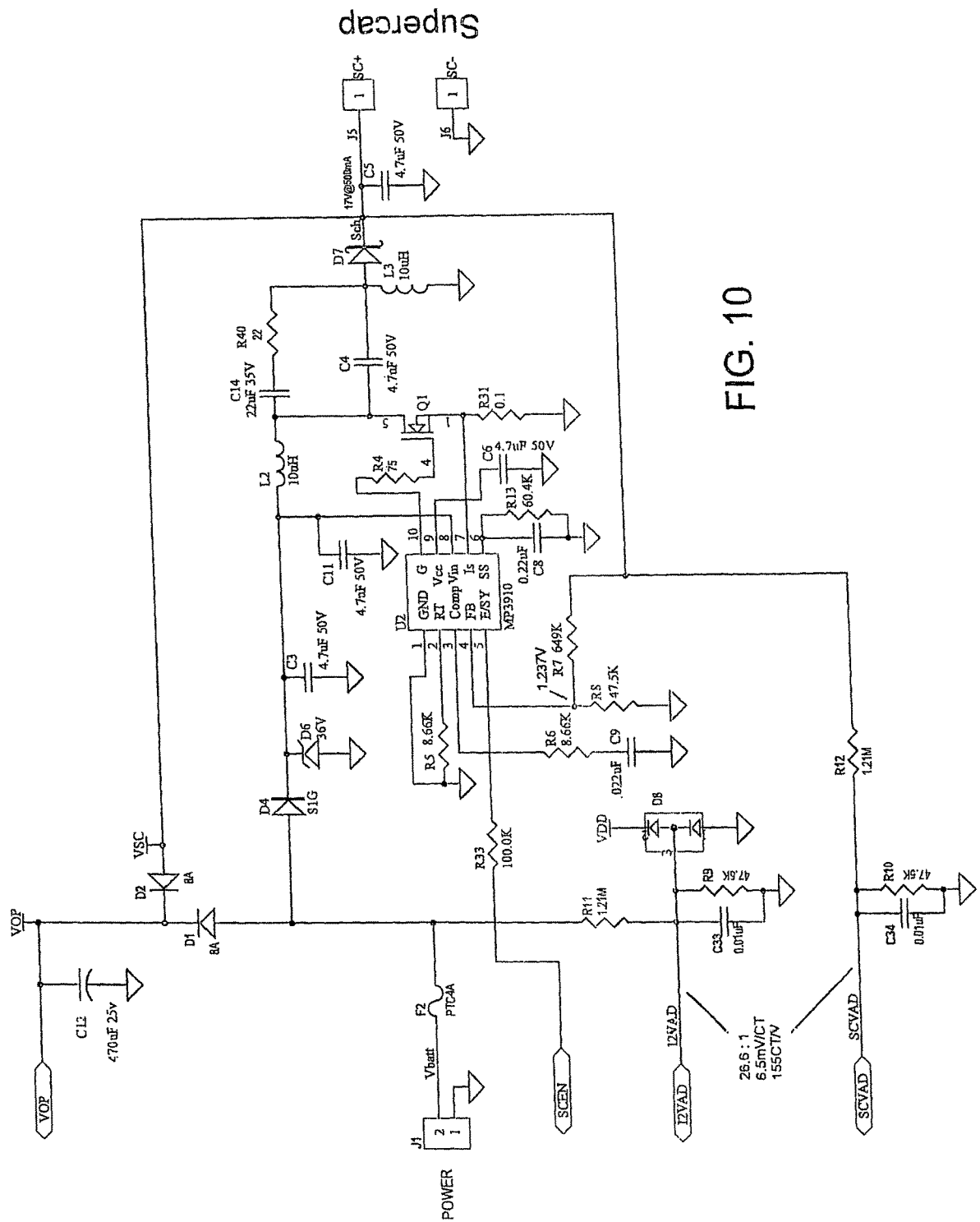
FIG. 10 is a detailed diagram of the supercapacitor charger of the brake control.
Figure 11:
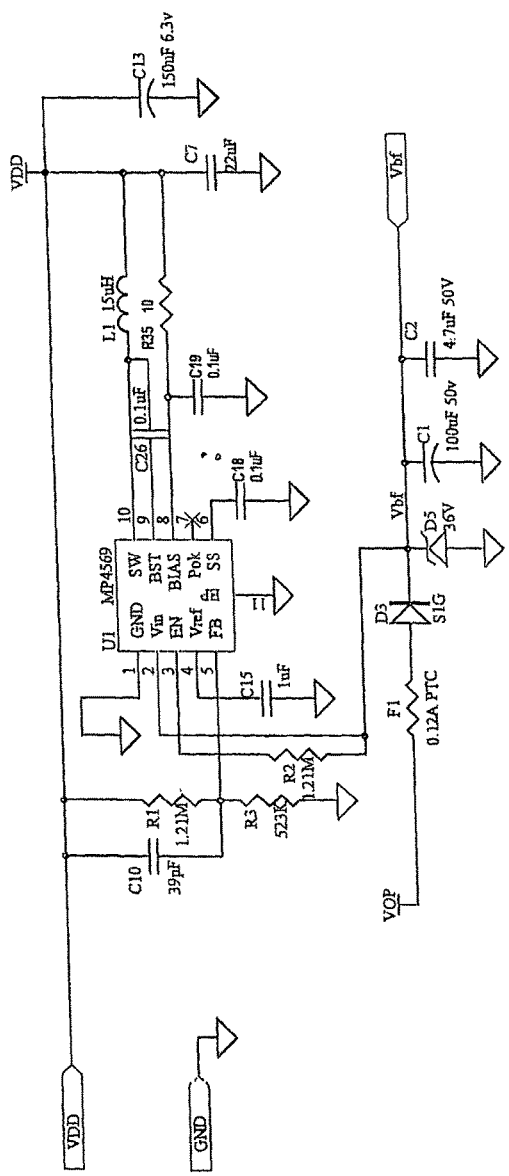
FIG. 11 is a detailed diagram of the brake voltage regulator of the brake control.
Figure 12:
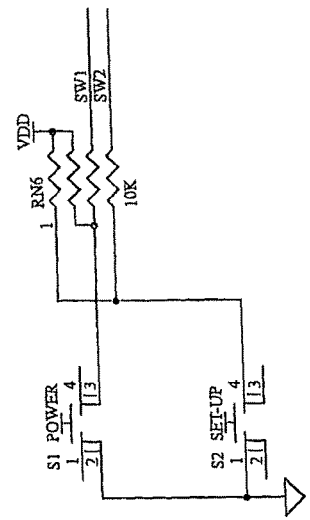
FIG. 12 is a detailed diagram of the brake interface of the brake control.
Figure 12:
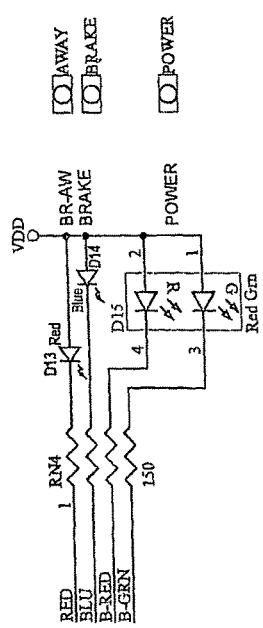
Figure 13:
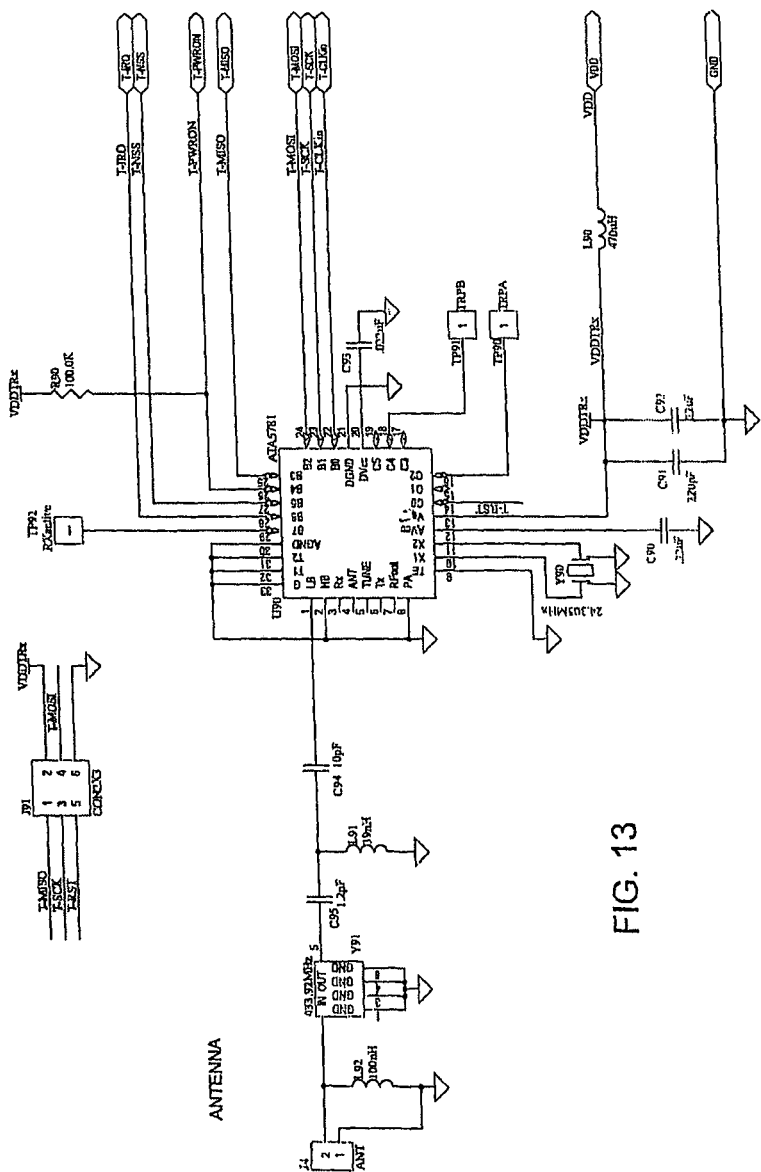
FIG. 13 is a detailed diagram of the brake receiver of the brake control.
Figure 14:
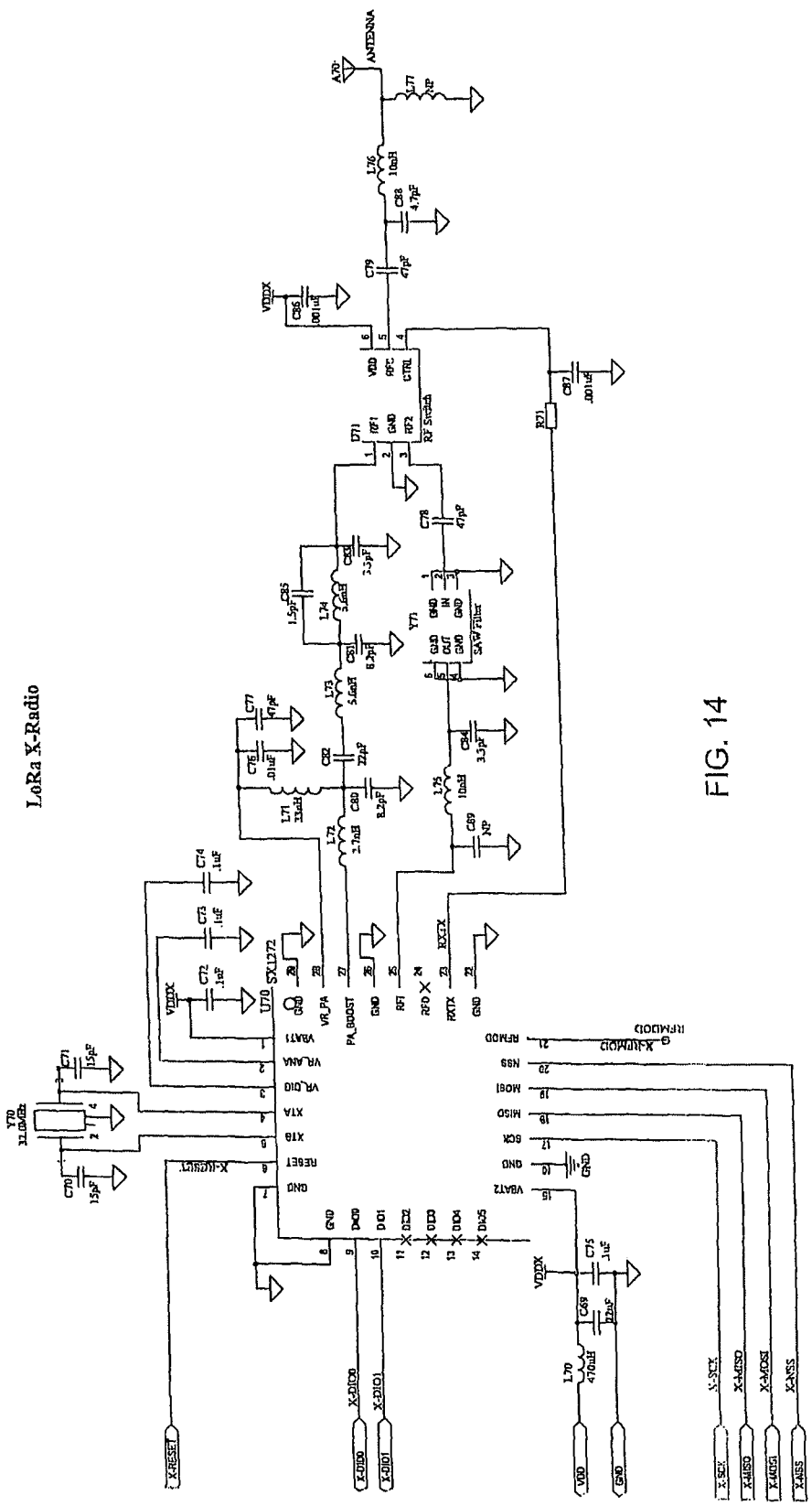
FIG. 14 is a detailed diagram of the brake transceiver of the brake control.
Figures 15, 16:
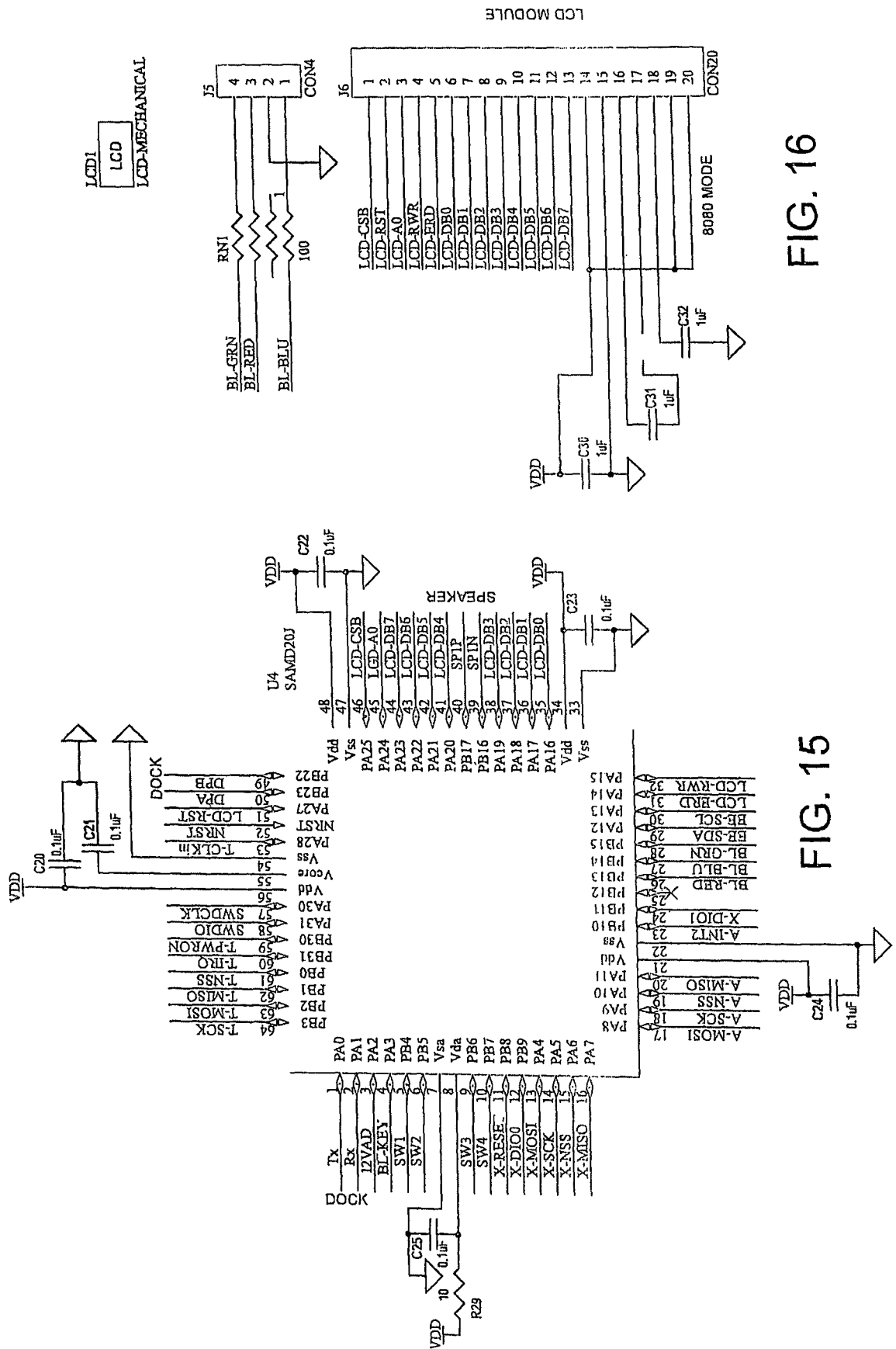
FIG. 15 is a detailed diagram of the remote microcontroller of the remote control.
FIG. 16 is a detailed diagram of the graphic display of the remote control.
Figure 17:
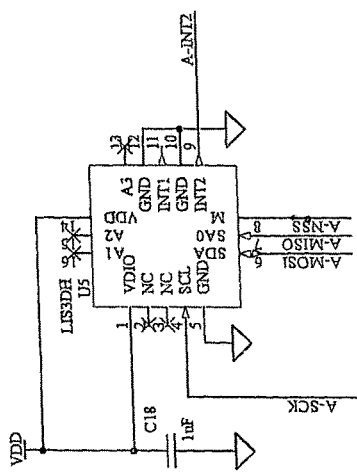
FIG. 17 is a detailed diagram of the remote inertia sensor of the remote control.
Figure 18:
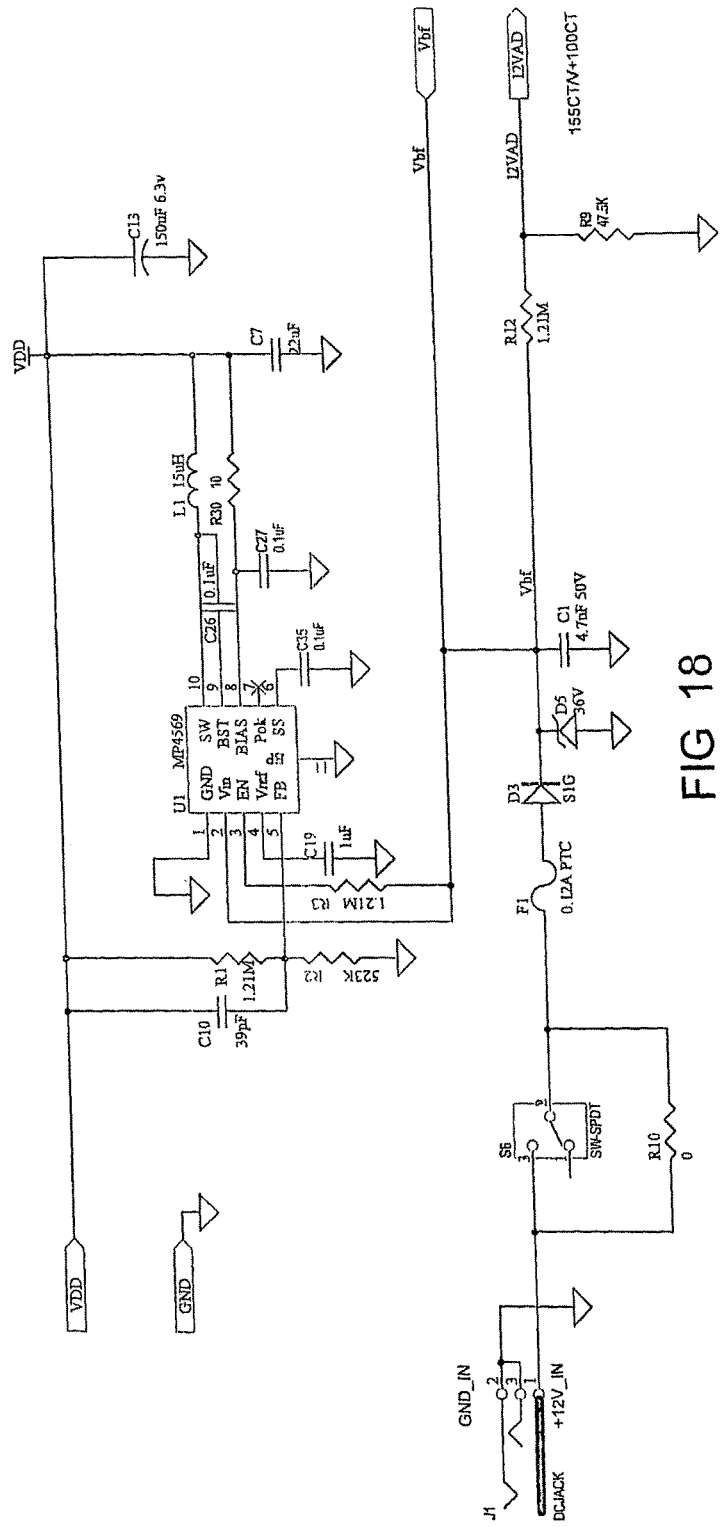
FIG. 18 is a detailed diagram of the remote power station of the remote control.
Figure 19:
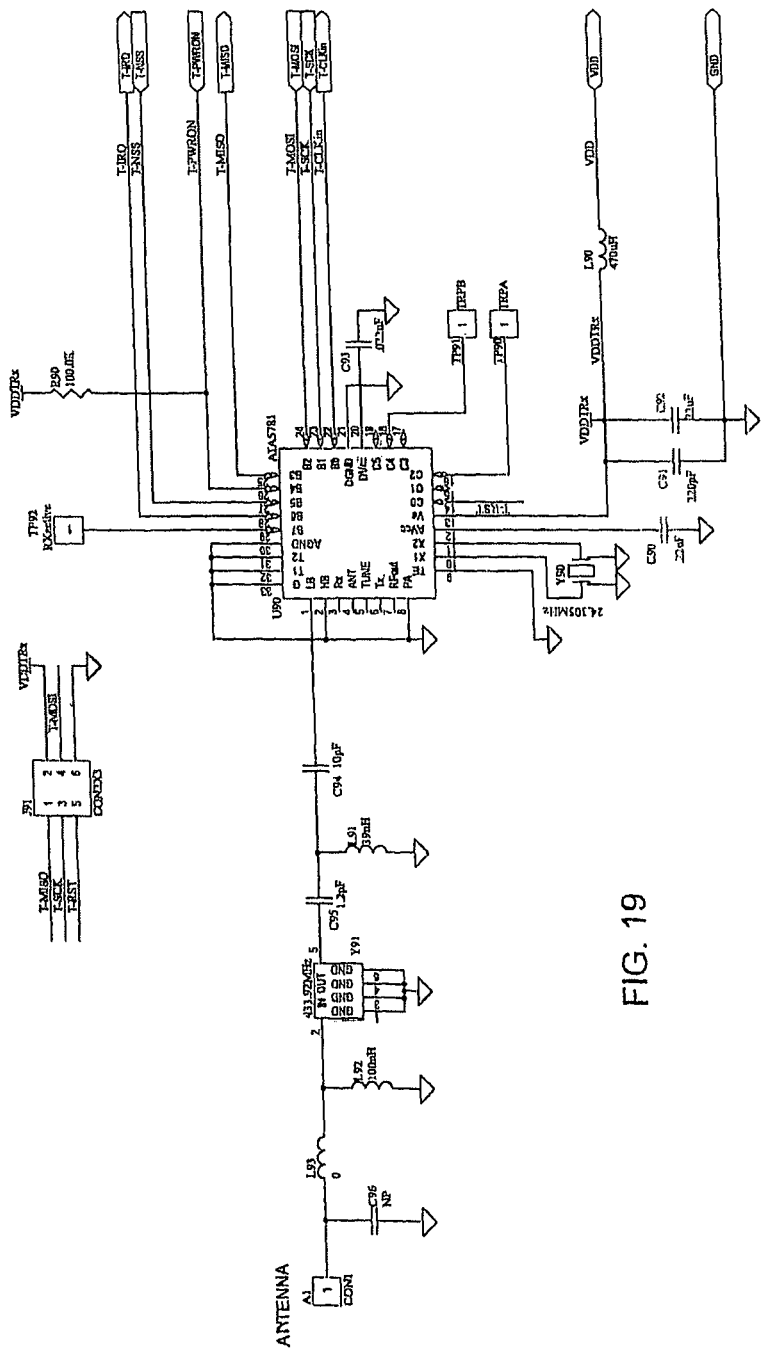
FIG. 19 is a detailed diagram of the remote receiver of the remote control.
Figure 20:
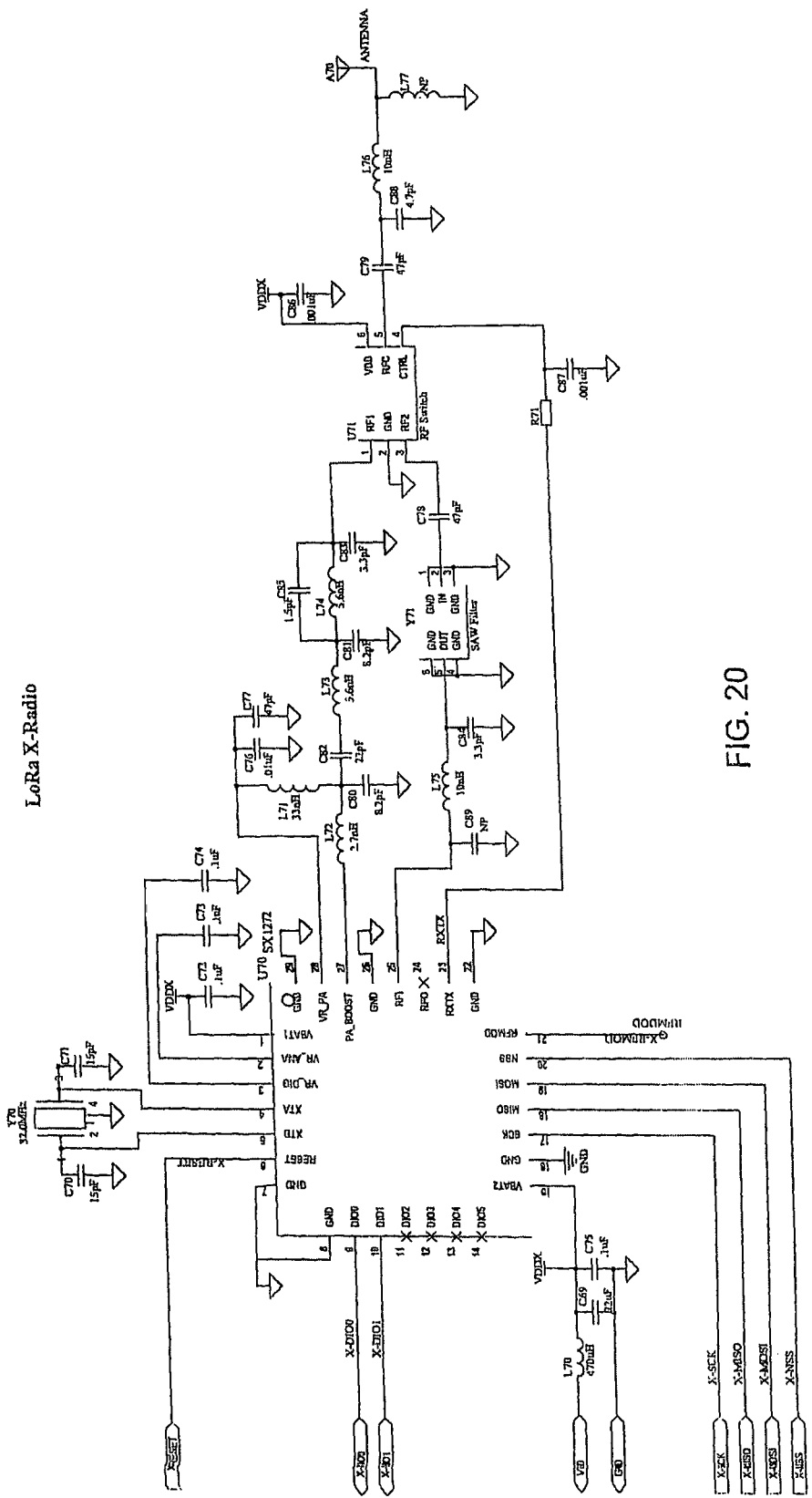
FIG. 20 is a detailed diagram of the remote transceiver of the remote control.

As shown in FIG. 3, the remote device 12 comprises a remote control housing or enclosure generally indicated as 54 to house remote control electronic circuitry and processor software (FIG. 6). The remote device 12 provides multiple data or information screens, remote display status of the hitch disconnect sensor status, tire pressure monitor status, remote braking control and system set-up functions. A graphic display 56 and a remote control interface comprising a plurality of control buttons or switches 60, 62 and 64 are positioned on the front panel 58 of the remote control housing or enclosure 54. The remote control interface provides input controls including braking device set-up configuration and selected braking system operating parameters. In addition, the remote control interface includes a manual brake control button or switch 66 to remotely actuate the linear actuator arm 26 of the braking device 10 of the braking control system.

A speaker 68 is mounted to the front panel 58 of the remote control housing or enclosure 54 to generate audible alert signals of operating conditions such as tire pressure warning or towed vehicle hitch disconnect event. In addition, a power cord and power receptacle adapter together generally indicated as 70 are connected or coupled to the remote control 12 to supply power from the towing vehicle nominal 12 volt battery (not shown) to the remote device 12 when the remote device 12 is located in the towing vehicle (not shown).

As shown in FIGS. 4A through 4D, the brake pedal coupler 30 comprises an upper hollow coupler member or block 72 having at least one upper clamp member generally indicated as 74 affixed to the front wall thereof and a lower coupler member or block 76 having at least one lower clamp member generally indicated as 78 affixed to the front wall thereof. A spring biased coupling member or post generally indicated as 80 is attached to the lower coupler member or block 76 and is slidably disposed within the upper hollow coupler member or block 72.

A locking tab or knob generally indicated as 82 is rotatably attached to the side of the upper hollow coupler member or block 72 disposed to selectively engage the spring biased coupling member or post 80 to lock the lower clamp member 78 and lower coupler housing 76, and the upper clamp member 74 and upper hollow coupler member or block 72 relative to each other to secure the brake pedal coupler 30 to the brake pedal 18 of the towed vehicle 14.

The upper clamp member 74 and lower clamp member 78 each comprises a substantially straight proximal portion or leg 84 extending outwardly and substantially perpendicular to the front wall of the upper hollow coupler member or block 72 and the front wall of the lower coupler member or block 76 respectively and an angled or inclined distal portion or leg 86 forming an obtuse interior angle with the corresponding substantially straight proximal portion or leg 84. The angled or inclined distal portion or legs 86 of the upper clamp member 74 and the lower clamp member 78 are inclined toward each other to cooperatively form a jaw-like configuration to clamp or securely couple the brake pedal coupler 30 to the brake pedal 18 of the towed vehicle 14.

The brake pedal coupler 30 further includes a first lock release bottom 88 mounted on the top wall of the upper hollow coupler member or block 72 and a second lock release button 90 mounted to the front wall of the upper hollow coupler member or block 72 to release the spring biased coupling member or post 80 when manually depressed.

A pair of substantially parallel upper clamp members 74 and a pair of substantially parallel lower clamp members 78 may extend outwardly from the upper hollow coupler member or block 72 and the lower coupler member or block 76 respectively in a similar fashion to the single upper clamp member 74 and the lower clamp member 78 described above.

Figure 4B:
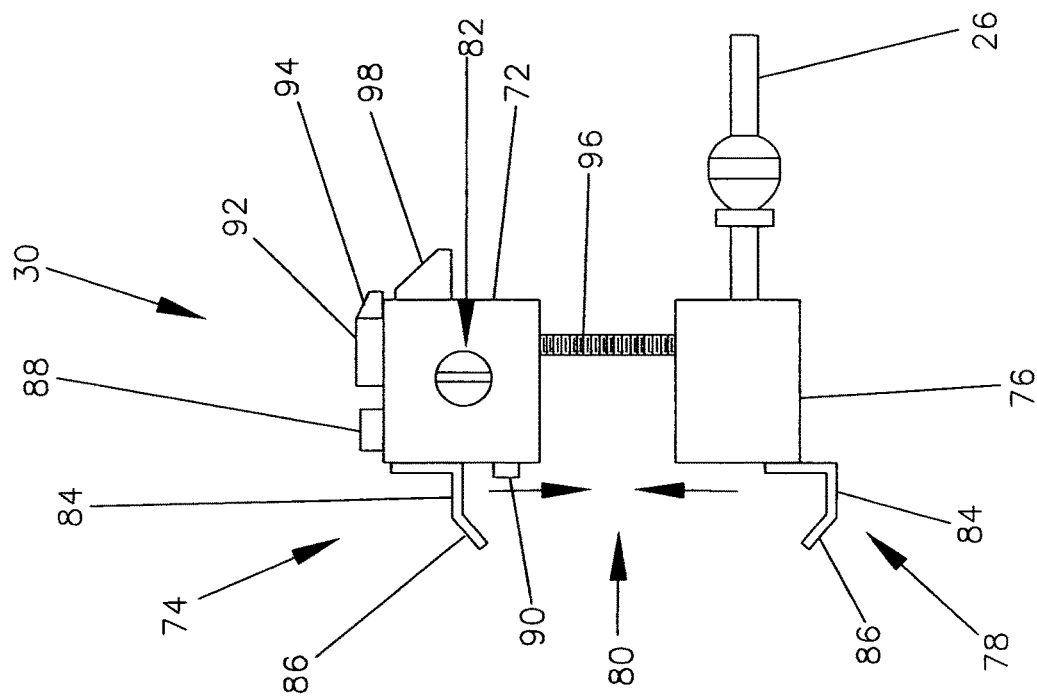
FIG. 4A-4D are side views of the brake pedal coupling device.
Figure 4A:
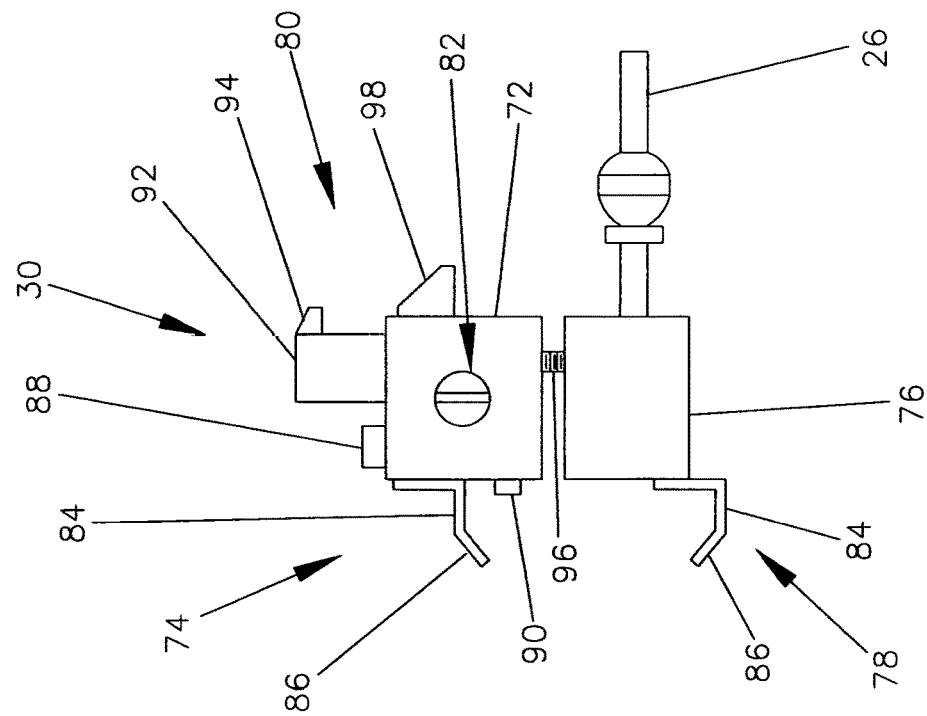
Figure 4D:
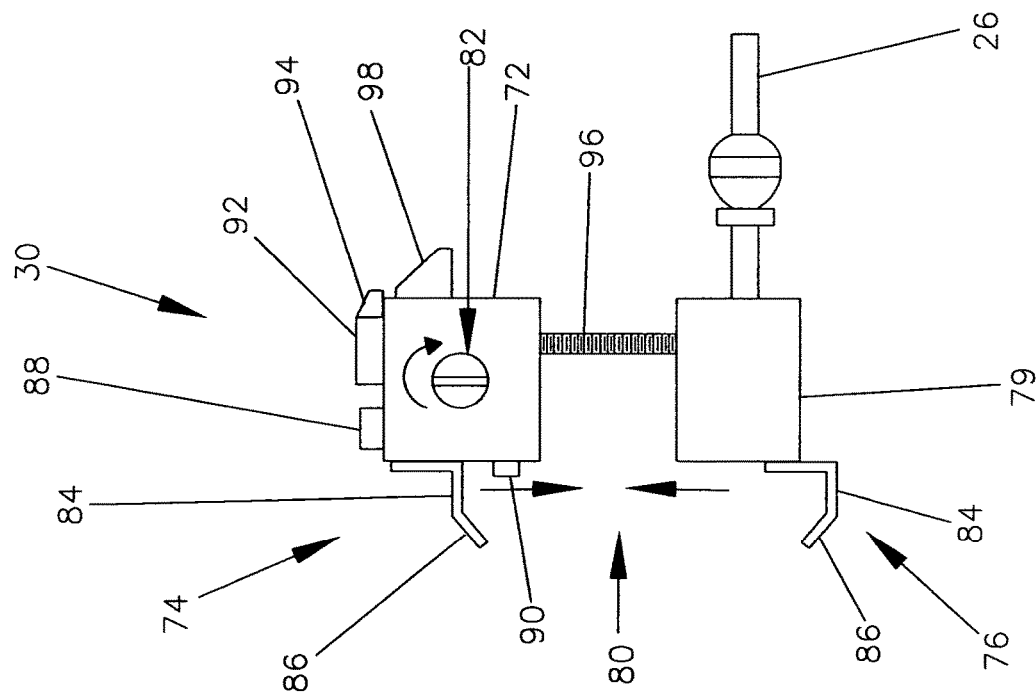

The upper clamp member 74 and lower clamp member 78 may be locked open or locked closed by rotation of the locking tab or knob 82 in a counter-clockwise direction (FIG. 4C) or a clockwise direction (FIG. 4D).

The spring biased coupling member or post 80 comprises an upper enlarged member 92 having a thumb tab 94 extending outwardly therefrom and a lower elongated threaded or notched member 96 extending downwardly from the lower portion of the upper enlarged member 92 to adjustably or movably couple the upper hollow coupler member or block 72 and the lower coupler member or block 76 together. A finger tab 98 extends outwardly from the upper hollow coupler member or block 72 that together with the thumb tab 94 facilitate adjustment of lower coupling member or block 76 relative to the upper hollow coupling member or block 72 to secure the brake pedal coupler 30 to the brake pedal 18 simply by squeezing the thumb and index finger together. Although the upper hollow coupler member or block 72 has been referred to as hollow, a channel (not shown) may be formed vertically through the upper coupler member or block 72 to slidably receive at least a portion of upper enlarged member 92 and at least a portion of the lower elongated threaded or notched member 96.

Extension and retraction of the linear actuator arm 26 by the electric brake actuator motor 24 to apply the braking force to the brake pedal 18 is controlled by the brake control to selectively depress and release the brake pedal 18 of the towed vehicle 14 proportionally or in synchronization with the towing vehicle (not shown) deceleration or acceleration as described hereinafter.

As depicted in FIG. 5, the brake control comprises a brake microcontroller 100 including digital and communication circuitry to receive and transmit signals to operate the electric actuator drive motor 24 and to communicate with the remote device 12 and tire pressure sensors (not shown) and hitch disconnect sensor (not shown).

In particular, the brake microcontroller 100 includes electronic components, logic circuitry and software to receive signals and power from the other elements and components of the braking device 10 and to generate control signals, status signals and operating signals fed to the various elements and components of the braking device 10 and to communicate with the remote device 12.

Power is supplied to the braking device 10 by a first or primary power source or energy storage device 101 and a second or secondary power source or energy storage device 103. The first or primary power source comprises a bank of supercapacitors generally indicated as 102 charged to a nominal 18 volts through a supercapacitor charger 104 and diode 105. The second or secondary power source 103 comprises a nominal 12 volt battery 106 such as the towed vehicle battery through steering diode 108 and a brake voltage regulator 110.

The boosted or increased supply voltage from the first or primary power source operates the electric actuator drive motor 24 at a significantly increased speed (revolutions per minute) increasing the speed of extension and retraction of the linear actuator arm 26 as the towing vehicle (not shown) and towed vehicle 14 decelerates or accelerates.

The electric brake actuator motor 24 is powered through an integrated motor driver circuit 112 controlled by the brake microcontroller 100. Power is supplied to the integrated motor driver integrated circuit 112 by the first or primary power source 101 and/or the second or secondary power source 103. The amount of current fed to the integrated motor driver integrated circuit 112 and, in turn, the electric brake actuator motor 24 is measured by a current sensor 114 coupled between the primary source 101 and secondary power source 103 and the integrated motor driver circuit 112. The current sensor 114 to also connected or coupled to the brake microcontroller 100 to fed real time current values to control the applied braking force. The system is designed or configured to operate at a constant current such as a nominal 6 amperes.

When the voltage of the primary power source 101 is equal to or greater than the voltage of the secondary power source 103 by a predetermined value the current is fed from the primary power source 101 to the microcontroller 100 and current sensor 114.

Alternately, current is fed from the secondary power source 103 when the voltage of the secondary source 103 is greater than the voltage of the brake microcontroller 100 by a predetermined value. The super capacitors 102 of the primary power source 101 can function as a back-up power source if current from the battery 106 is interrupted to retract the linear actuator arm 26.

When the voltage of primary power source 101 and secondary power source 103 and with a predetermined range relative to each other current is fed from both sources.

The electric brake actuator motor 24 is rated to operate at 4000 revolutions per minute with a nominal 12 volt power source. However as previously mentioned, when the first or primary power source or supercapacitors 102 supplies about a nominal 17 volts to about nominal 18 volts, the electric brake actuator motor 24 operates at about 5850 revolutions per minute rather than the rated 4000 revolutions per minutes an increase of rotational speed of at least about 25 percent.

The nominal 12 volt battery 106, bank of supercapacitors 102, supercapacitor charger 104, integrated motor driver integrated circuit 112 and current sensor 114 are all coupled or connected to the brake microcontroller 100.

The position of the brake pedal coupler 30 and the linear actuator arm 26 relative to the fully retracted position directly correlates or corresponds to the applied braking force detected by an applied braking force detector implemented in one of several ways. For example, a motor encoder 116 senses and reads or counts the number of revolutions or turns of the electric brake actuator drive motor 24 when extending or advancing the linear actuator arm 26 from the fully retracted position to the linear position corresponding to the required applied braking force calculated by the brake microcontroller 100. The applied force corresponding to the G force sensed or measured by a brake inertia sensor 128 is directly related to the distance the brake pedal coupler 30 and the linear actuator arm 26 is extended from the fully retracted position.

The force applied to the brake pedal 18 is calculated by the brake microcontroller 100 by sensing the current drawn by the electric brake actuator drive motor 24.

In addition, the force applied on the brake pedal 18 by the brake pedal coupler 30 and the linear actuator arm 26 may be calculated by the brake microcontroller 100 as a function of the number of revolutions or turns of the electric actuator drive motor 24 counted by the motor encoder 116. Alternately, a mechanical force sensor 118 such as a strain gauge mounted on the linear actuator arm 26 detects or senses directly the applied force exerted on the brake pedal 18 by the linear actuator arm 26. The applied force is fed to the brake microcontroller 100 to control the extension and retraction of the linear actuator arm 26 to the position corresponding to the calculated applied force relating to the G force measured by the brake inertia sensor 128. Of course, the mechanical force sensor 118 may be mounted on the linear actuator arm 26, brake pedal 18 or electric brake actuator drive motor 24 to sense the actual braking force exerted by the linear actuator arm 26 on the brake pedal 18.

Otherwise, as the force applied to the brake pedal (not shown) in the towing vehicle (not shown) increases or decreases, the electric brake actuator drive motor 24 extends or retracts the linear actuator arm 26 by rotating the number of revolutions or turns of the electric brake actuator drive motor 24 corresponding to the number of revolutions or turns corresponding to the real time applied force determined by the brake microcontroller 100. Alternately, as the towing vehicle (not shown) accelerates or decelerates, the brake inertia sensor 128 senses real time G force values exerted on the towed vehicle 14 and feeds a G force signal to the brake microcontroller 100 to extend or retract the linear actuator arm 26 and brake pedal coupler 30 to the linear position distance correlating to the current real time force corresponding to the measured or sensed real time G force.

A brake transceiver generally indicated as 120 is connected to the brake microcontroller 100 to exchange system configuration information and packet data with the remote device 12 to provide remote and network control.

A brake receiver generally indicated as 122 is connected to the brake microcontroller 100 to receive tire pressure measurements from the towed vehicle tires for transmission by the transceiver 120 to the remote device 12.

Periodically the remote device 12 transmits requests for status information or data packets to the braking device 10 that responds by transmitting the requested information or data as well as brake event information to the remote device 12.

A Bluetooth module 124 may be used to provide wireless computer connectivity. The Bluetooth module 124 communicates with the brake microcontroller 100 using serial data connections and does not operate while the transceiver 120 is transmitting.

The brake interface or input control panel 38 including the setup button or switch 40, power button or switch 42 and LEDs is coupled to the brake microcontroller 100 to set-up and operate the braking device 10.

As previously described, the brake inertia sensor 128 such as an accelerometer is connected or coupled to the brake microcontroller 100 to sense and feed real time G-force information exerted on the towed vehicle 14 to the brake microcontroller 100 as the speed of the towed vehicle 14 increases or decreases as the speed of the towing vehicle (not shown) increases or decreases. In turn, the brake microcontroller logic and software generate the braking force to be applied to the brake pedal 18 as the linear actuator arm 26 and brake pedal coupler 30 are extended or retracted by the electric actuator drive motor 24.

As shown in FIG. 6, the remote device 12 comprises a remote microcontroller 200 including digital and communication circuitry to receive and transmit signals to monitor and selectively control the braking device 10. In particular, the remote microcontroller 200 includes electronic components, logic circuitry and software to receive signals and power from the other elements and components of the brake device 10 and to generate and transmit control signals, status signals and operating signals fed to the various elements of the braking device 10.

Power is supplied to the remote device 12 by a power source such as a nominal 12 volt battery generally indicated as 202 through a voltage regulator 204 such as the battery of the towing vehicle (not shown).

A remote transceiver generally indicated as 206 is connected to the remote microcontroller 200 to exchange configuration and a packet data with the braking control 10 through the brake transceiver 120 and to provide remote control of the braking device 10 including the electric actuator drive motor 24 and the linear actuator arm 26.

A remote receiver generally indicated as 208 is connected to the remote microcontroller 200 to receive tire pressure measurements from the towed vehicle tires directly or through the remote transceiver 206.

Digital packet and configuration data are communicated between the brake microcontroller 100 and the remote microcontroller 200 through the brake transceiver 120 and the remote transceiver 206 and the remote receiver 208. Periodically, data packets and switches events are also transmitted between the brake transceiver 120 and the remote transceiver 206.

A remote interface or control generally indicated as 210 coupled to remote manual brake button or switch 66 and to the control buttons or switches 60, 62 and 64 along with light emitting backlights 212 is coupled or connected to the circuitry and logic of the remote microprocessor 200.

A remote inertia sensor generally indicated as 214 such as an accelerometer is coupled to the remote microprocessor 200 to sense or measure the real time G-forces exerted on the remote device 12 as the towing vehicle (not shown) accelerates or decelerates to provide power management by energizing the remote device 12 on demand or only when needed.

The graphic display 56 comprises a liquid crystal diode screen with red, green and blue light emitting diode backlights 212 coupled to the remote microcontroller 200 to visually display system data or information. The graphic display 56 may selectively display a plurality of screens such as home screen, gain screen to set the gain from 1 to 9 as an example, manual brake screen, hitch break-away screen, configuration screen including device pairing, sets maximum force value, selects active braking mode, selects tpms enable, operation and screens, selects LCD background color and selects Bluetooth down-load, tpms screens, protected settings screen to set current sensor calibration and Bluetooth down-load screen.

Various system status information may be provided by at least one light emitting diode generally indicated as 216 emitting green to indicate fully operable, yellow for caution and red for fault. As previously stated, the remote manual brake button or switch 66 and remote control switches 60, 62 and 64 are connected or coupled to the remote microcontroller 200 through the switch portal 210.

Figure 4C:
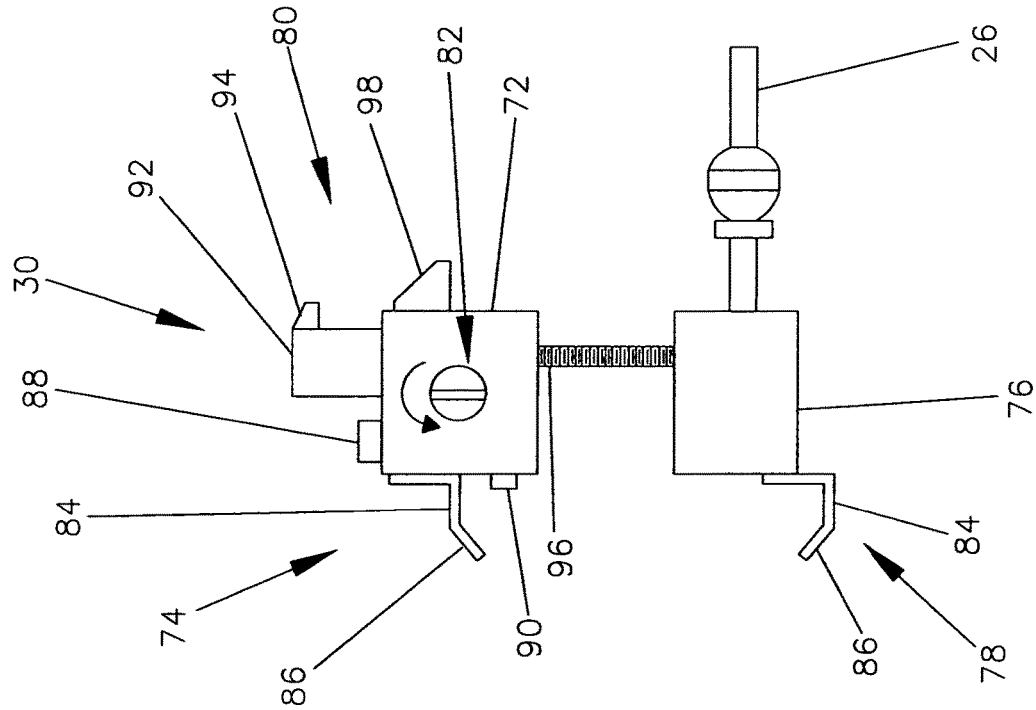

To install the braking device 10 in the towed vehicle 14 as depicted in FIG. 1, the driver's seat 16 is pushed back allowing space for the braking device 10 to be placed on the floor between the brake pedal 18 and the front of the driver's seat 16. The brake pedal coupler 30 is then secured to the brake pedal 18. Specifically, when the upper clamp member 74 and lower clamp member 78 are in the open position as shown in FIG. 4A, the brake pedal coupler 30 is placed on the brake pedal 18. The upper clamp member 74 and lower clamp member 78 are then closed or clamped onto the brake pedal 18 by squeezing or depressing the thumb tab 94 and finger tab 98 toward each other as indicated by the arrows in FIG. 4B until the upper clamp member 74 and lower clamp member 78 of the brake pedal coupler 30 securely engage and grasp the brake pedal 18. Once in position, either the first release button 88 or the second release button 90 is depressed. Finally, the upper clamp member 74 and lower clamp member 78 are locked in position relative to each other on the brake pedal 18 by rotating the locking knob 92 counterclockwise as shown in FIG. 4C. The upper clamp member 74 and lower clamp member 78 are unlocked by rotating the locking knob 92 clockwise as shown in FIG. 4D.

With the brake pedal coupler 30 secured to the brake pedal 18, the driver's seat 16 is moved forward against the adjustment pad 32 of the braking device 10. If necessary, the adjustment pad 32 may be adjusted toward or away from the rear wall of the brake control enclosure or housing 22. When the braking device 10 is properly positioned, the driver's seat 16 should not exert pressure on the braking device 10 or brake pedal 18.

Once the braking device 10 is properly positioned and secured in place, the power supply connector and power cord 46 are connected or coupled to the nominal 12 volt power receptacle (not shown) of the towed vehicle 14 causing an indicator light on the power cord 46 to illuminate.

Initially, when the setup button or switch 40 is depressed an indicator light associated with the setup button or switch 40 blinks repeatedly.

The braking device 10 is then configured using the remote control button(s) or switch(es) 60, 62 and 64 of the remote interface or control 210 and the graphic display 56 or brake interface or input brake control panel 38.

The first or primary power source 102 is charged by the second or secondary power source 106 through the supercapacitor charger 104. The supercapacitor charger 104 charges the first or primary power source 102 when towed vehicle battery is greater than about 10.5 volts to about a nominal 18.0 volts. When the charge or voltage of the supercapacitors 102 drops to about 16 nominal volts then the supercapacitor charger 104 is again enabled to recharge the first or primary power source to about a nominal 18 volts.

When the braking device 10 is configured and with power supplied to the brake device 10, the power button or switch 42 is depressed energizing the electric brake actuator motor 24 partially extending the linear actuator arm 26 from the fully retracted position depressing the brake pedal 18 to partially deplete a portion of the vacuum from the vacuum power assist brake system 20. At set-up, the linear actuator arm 26 cycles only once returning to the fully retracted position. In addition, the partial extension of the linear actuator arm 26 functions to verify that the brake actuator extension is within the range of motion.

After the braking device 10 is configured and set-up, a predetermined number of braking cycles apply only partial braking forces of the calculated applied braking force to further purge the vacuum power assist brake system. Specifically, such an initial braking sequence may comprise:
  complete a first sequence of at least one (1) braking cycle at a first reduced or fractional braking force such as 30 pounds when the calculated braking force is 60 pounds in response to the measured G force.
  complete a second sequence of at least two (2) braking cycles at a second reduced or fractional braking force greater than the first reduced braking force but less than the calculated braking force of 60 pounds in response to the measured G force such as 45 pounds.
  after completing the first and second braking sequences the applied braking force such as 60 pounds is calculated or determined by the system logic and software and G force on the brake inertia sensor 128 during deceleration of the towing vehicle and towed vehicle 14.

A complete braking sequence comprises braking events; that is, extension of the linear actuator arm 26 depressing the brake pedal 30 where the motor current reaches the stop motor set point (braking force amount) without early braking termination.

Acceleration to initiate a braking event requires a minimum G force such as 0.05 Gs for five (5) consecutive 20 ms periods dependent on gain programmed at set-up. This braking event qualification reduces or eliminates false braking that may result from traveling over railroad tracks, pot holes or similar occurrences.

If the towed vehicle hitch (not shown) is dislodged or broken, a braking force will be actuated. During a breakaway initiation, the graphic display 56 of the remote device 12 will display "BREAK-AWAY" with a red backlight and an audible alert alarm will be sounded or emitted by the speaker 68. The "BREAK-AWAY" indicator can be cleared by depressing one of the remote control interface controls 60, 62 or 64.

The amount of force applied by the linear actuator arm 26 and brake pedal coupler 30 to the brake pedal 18 is proportional to the deceleration G force sensed by the brake inertia sensor accelerometer 128. For example, if the maximum force capable of being applied at 1G is 90 pounds programmed into the brake microcontroller 100 by the remote control 12 then a 45 pound force will be applied to the brake pedal 18 at ½ G deceleration and a force of 67.5 pounds would be applied to the brake pedal 18 when the deceleration is ¾ Gs. The electronic circuitry and software of the brake microcontroller 100 calculates the amount of force that correlates to real time G force to be applied on the towed vehicle 14 and generates a control signal to the electric brake actuator drive motor 24.

The force applied by the brake device 10 to the brake pedal 18 is controlled by the amount of current fed to the electric brake actuator drive motor 24 through the integrated motor driver integrated circuit 112 of the brake microcontroller 100. The applied force is monitored real time or sensed by the force sensor that is either the mechanical force sensor 118 or by the motor revolution encoder 116 that senses the revolutions of the electric actuator drive motor 24 as linear actuator arm 26 and the brake pedal coupler 30 extend or retract and generates a signal fed to the brake microcontroller 100 that correlates the number of turns or revolutions of the electric brake actuator drive motor 24 is from the fully retracted position that is correlated to the applied force.

When retracting the linear actuator arm 26 and the brake pedal coupler 30 at the end of a braking cycle or as the amount of deceleration is decreased by easing off of the towing vehicle braking system, the electric brake actuator drive motor 24 retracts the linear actuator arm 26 and brake pedal actuator 30 reducing or eliminating the braking force on the brake pedal 18. The position of the linear actuator arm 26 relative to the fully retracted position when no force is applied to the brake pedal 18 is sensed either by the mechanical force sensor 118 or revolutions registered by the motor revolution encoder 116 as an indication of the position or extension of the linear actuator arm 26 related to the original or fully retracted position and corresponding applied force.

The first or primary power source 102 not only provides increased motor speed (rpm) but also assures that the linear actuator arm 26 and brake pedal coupler 30 can be fully retracted even if the second or secondary power source 106 is not sufficient to retract the linear actuator arm 26.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

In describing the invention, certain terms are used for brevity, clarity, and understanding. No unnecessary limitations should be inferred beyond the requirement of the prior art because such terms are used for descriptive purposes and are intended to be broadly construed. The different structural and functional elements, apparatuses, devices, compositions, and methods described herein may be used alone or in combination with other structural and functional elements, apparatus, devices, compositions, systems and methods. It is to be expected that various equivalents, alternatives and modifications are possible.

What is claimed is:

1. A braking control system to synchronize the operation of the braking system of a towed vehicle with the braking system of a towing vehicle to match the deceleration and acceleration of the towed vehicle with the deceleration and acceleration of the towing vehicle, said braking control system comprises a braking device installed in the towed vehicle and including a linear actuator having a predetermined range of motion selectively movable between a retracted position and an extended position coupled between a reversible electric motor and the brake pedal of the towed vehicle and a control device including a microcontroller coupled to said reversible electric motor, said microcontroller including circuitry and software to calculate the proportional braking force corresponding to the sensed acceleration or deceleration of the towing vehicle and a sensor to sense the braking force applied to the brake pedal of the towed vehicle by said linear actuator and to generate a corresponding signal fed to said microcontroller indicating the applied braking force of said linear actuator to selectively extend and retract said linear actuator to depress and release the brake pedal of the towed vehicle as the towing vehicle decelerates and accelerates during a braking event and wherein after set-up of said braking control system in the towed vehicle said reversible electric motor partially extends said linear actuator to apply a first predetermined braking force against the brake pedal, calculated by said microcontroller and sensed by said sensor to incrementally evacuate a portion of the vacuum assist to reduce the force exerted by the braking system of the towed vehicle on the brake pedal such that the combined braking force of said first braking force sensed by said sensor and the force from the vacuum assist does not exceed the maximum braking force of the braking system of the towed vehicle and then retracts said linear actuator releasing the brake pedal of the towed vehicle followed by a second partial extension of said linear actuator greater than the first partial extension of said linear actuator to apply a second braking force against the brake pedal calculated by said microcontroller and sensed by said sensor greater than said first braking force against the brake pedal of the towed vehicle to further incrementally evacuate a portion of the vacuum assist to further reduce the force exerted by the braking system of the towed vehicle on the brake pedal such that the combined braking force of said second braking force sensed by said sensor and the force from the vacuum assist does not exceed the maximum braking force of the braking system of the towed vehicle and then retracts said linear actuator releasing the brake pedal of the towed vehicle followed by another extension of said linear actuator greater than the second partial extension to apply an additional braking force against the brake pedal calculated by said microcontroller and sensed by said sensor greater than said second braking force against the brake pedal of the towed vehicle to further incrementally evacuate a portion of the vacuum assist to further reduce or eliminate the vacuum assist of the braking system of the towed vehicle.

2. The braking control system of claim 1 wherein the braking force applied by said linear actuator to the brake pedal is proportional to the deceleration force sensed by a brake inertia sensor accelerometer coupled to said control device.

3. The braking control system of claim 2 wherein said circuitry and software of said control device calculates the braking force to be applied on the towed vehicle proportional to the G force on the decelerating towing vehicle and generates a control signal fed to said reversible electric motor to synchronize the braking of the towing vehicle and the towed vehicle.

4. The braking control system of claim 1 wherein the braking force corresponding to the deceleration force sensed by said brake inertia sensor is directly related to the distance of said linear actuator arm is extended from said retracted position.

5. The braking system of claim 1 wherein a braking event requires a predetermined minimum braking force for a predetermined plurality of time periods each for a predetermined period of time.

6. The braking control system of claim 1 wherein said sensor senses the current drawn by said reversible electric motor.

7. The braking control system of claim 1 wherein said sensor comprises a motor encoder to sense and read the number of revolutions of said reversible electric motor when extending said linear actuator from said retracted position to the position corresponding to the required braking force calculated by said brake microcontroller.

8. The braking control system of claim 1 wherein said sensor is a mechanical force sensor.

9. The braking control system of claim 8 wherein said mechanical force sensor comprises a strain gauge.

* * * * *